(12) United States Patent
Nakagawa et al.

(10) Patent No.: US 7,472,692 B2
(45) Date of Patent: Jan. 6, 2009

(54) ENGINE CONTROL APPARATUS

(75) Inventors: Shinji Nakagawa, Hitachinaka (JP);
Kazuhiko Kanetoshi, Hitachinaka (JP);
Kozo Katogi, Hitachi (JP); Takanobu Ichihara, Naka (JP); Minoru Ohsuga, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 208 days.

(21) Appl. No.: 11/656,383

(22) Filed: Jan. 23, 2007

(65) Prior Publication Data

US 2007/0169757 A1  Jul. 26, 2007

(30) Foreign Application Priority Data

Jan. 24, 2006  (JP) ............... 2006-015262

(51) Int. Cl.
*F02M 51/00* (2006.01)
*G06F 19/00* (2006.01)

(52) U.S. Cl. .................. 123/491; 701/113
(58) Field of Classification Search ........... 123/491, 123/299, 305, 478, 480; 701/113
See application file for complete search history.

(56) References Cited

U.S. PATENT DOCUMENTS 4,564,907 A * 1/1986 Mouri et al. ............ 701/113

7,128,053 B2 * 10/2006 Tokuda et al. ............ 123/431

FOREIGN PATENT DOCUMENTS

| JP | 63-170533 A | * | 7/1988 |
| JP | 8-177553 A | | 7/1996 |
| JP | 2001-41094 A | | 2/2001 |

* cited by examiner

*Primary Examiner*—Hieu T Vo
(74) *Attorney, Agent, or Firm*—Crowell & Moring LLP

(57) ABSTRACT

An engine control apparatus which can ensure and maintain a stability and constant exhaust emission characteristics even in such a condition that a nature of a fuel used as present is unsure, and which is robust among different fuel natures, comprising a plurality of different nature fuel quantity computing means and an operating condition detecting means for detecting an operating condition of an engine, wherein a first nature fuel quantity computing means among the plurality of different nature fuel quantity computing means is used as a fuel quantity computing means during an engine start, and the first nature fuel quantity computing means is forcibly changed over into a second nature fuel quantity computing means if an engine operating condition detected by the operating condition detecting means satisfies a predetermined term.

22 Claims, 25 Drawing Sheets

(FIRST NATURE FUEL QUANTIY) > (SECOND NATURE FUEL QUANTITY)

FIG.8
LOWERING OF TORUE DUE TO RAREFACTION WITH HEAVY FUEL
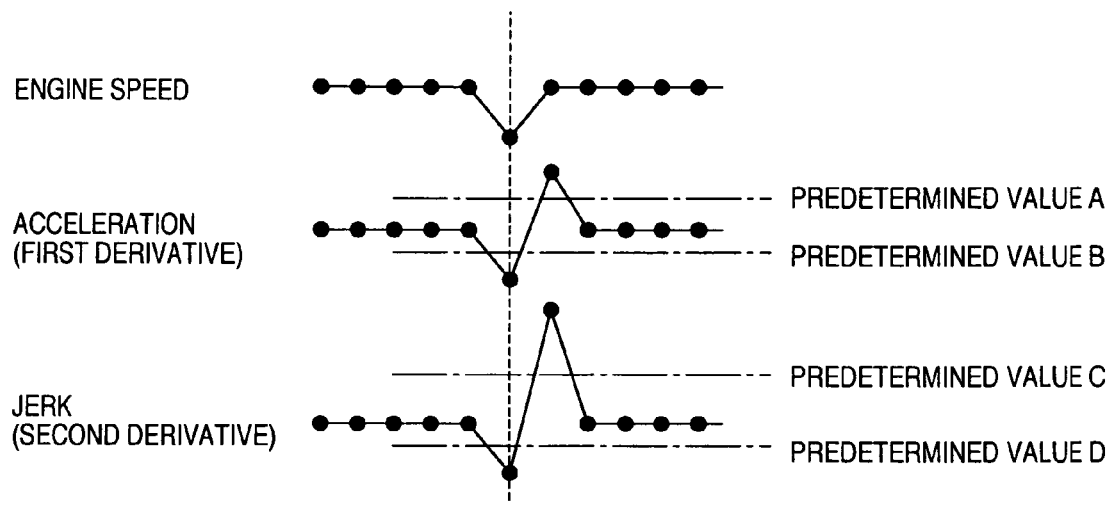
LOWERING OF TORQUE DEUT TO RAREFACATION WITH HEAVEY FUEL
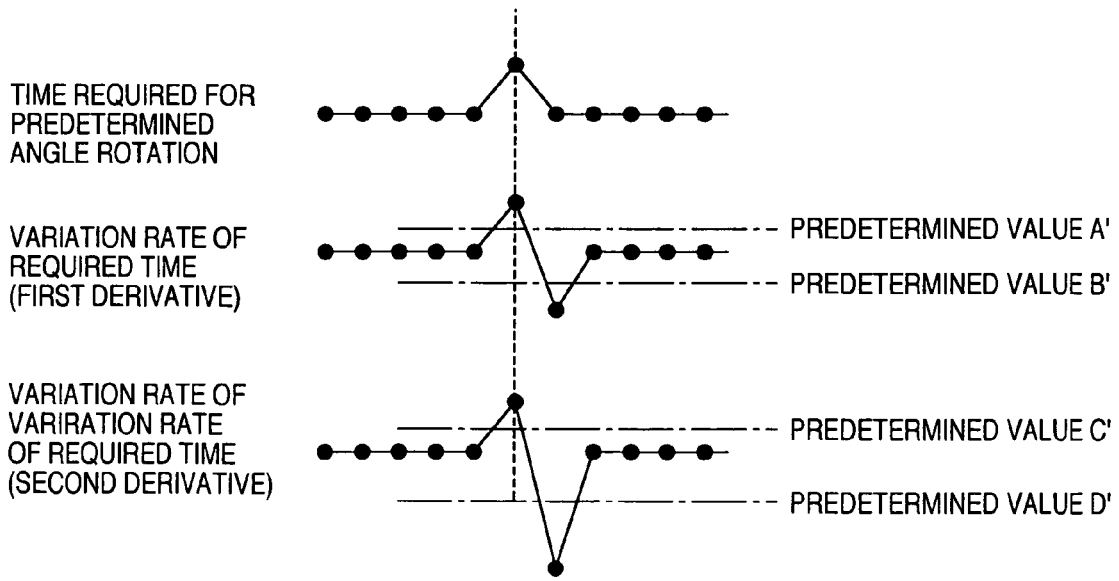

<125: FUEL CORRECTION VALUE COMPUTING MEANS>

<225: FUEL CORRECTION VALUE COMPUTING MEANS>

<130': FUEL CORRECTION VALUE CHANGE-OVER DETERMINING MEANS>

<150: FUEL NATURE DETERMINING MEANS>

ENGINE CONTROL APPARATUS

BACKGROUND OF THE INVENTION

The present invention relates to an engine control apparatus for controlling an engine (internal combustion engine) installed on an automobile or the like, and in particular to an engine control apparatus which can ensure and maintain stable and constant emission characteristics even in such a condition that a fuel nature (as heavy fuel, light fuel or the like) is unsure, and which is robust among different fuel natures.

These years, since the regulations of emission control as to automobile engines have been more and more tightened in the North America, Europe, Japan and the like, there has been the demand of further reducing engine exhaust emission. The performance of catalyst and the degree of precision of the catalyst control have been enhanced, and accordingly, the volume of exhaust emission from an engine is dominant during a start of the engine. In general, natures of fuel are uneven in a predetermined range, and accordingly, fuel evaporation rates vary, depending upon their natures during low temperature operation. Since the fuel combustion amount varies with respect to a fuel injection quantity, the difference among fuel natures affect upon the starting characteristic and the exhaust performance (exhaust emission characteristics) of an engine. Thus, as disclosed in, for example, JP-A-8-177553 and JP-A-2001-41094, there have been heretofore proposed various systems in which the engine control is adapted to a nature of fuel which is used at present in the engine.

Namely, the JP-A-8-177553 discloses an engine control apparatus comprising a means for calculating a heavy fuel quantity, a means for calculating a light fuel quantity, a means for determining a fuel nature, and a means for changing over from the heavy fuel calculating means into the light fuel calculating means when it is determined that a fuel to be used is a light fuel. However, since the engine control apparatus disclosed in this document is initially set for a heavy fuel, a relatively large quantity of fuel is injected until the use of light fuel is confirmed, and accordingly, the air-fuel ratio becomes rich, resulting in deterioration of emission characteristics. Further, in addition to the above-mentioned configuration, although a system for determining a fuel nature in view of a variation in engine speed is used, should a light fuel be used under setting of a heavy fuel, no substantial difference in engine speed would be appreciated when the air-fuel ratio is changed over into the rich side even though the air-fuel ratio become richer than that during the use of a heavy fuel, as shown in FIG. 13. This is because toque (pressure in cylinder) does not vary appreciably on a side richer than the theoretical air-fuel ratio. Thus, it is fundamentally difficult to determine a fuel nature from an engine speed, and should the use of a light fuel be unable to be determined, fuel injection would be carried out under setting of a heavy fuel, deterioration of emission characteristics is unavoidable.

Further, the JP-A-2001-41094 discloses an engine control apparatus comprising a first start control means for a light fuel, a second start control means for a heavy fuel, for changing over from the first start control means into the second start control means if a start is not completed within a predetermined time. However, since the engine control apparatus disclosed in this document, is initially set for a light weight fuel, the starting performance deteriorates in the case of using a heavy fuel, and accordingly, in the worst case, the product value, that is, the reliability would be detrimentally affected. Further, should the evaporation rate of the heavy fuel be extremely low, no initial detonation would occur, and accordingly, unburnt injected fuel would be emitted into the atmosphere, resulting in a problem of deterioration of emission characteristics.

BRIEF SUMMARY OF THE INVENTION

The present invention is devised in view of the above-mentioned problems inherent to the prior art, and accordingly, an object of the present invention is to provide an engine control apparatus which can ensure and maintain stable and constant exhaust emission characteristics even in such a condition that the nature of a fuel which is used at present is not sure, and which is robust among different fuel natures.

To the end, according to a first aspect of the present invention, there is provided an engine control apparatus comprising a plurality of different nature fuel quantity computing means, and a means for detecting an operating condition of an engine, wherein a first nature fuel quantity means among the plurality of fuel quantity computing means, is used as a fuel quantity computing means during an engine start, and after the engine start, the first nature fuel quantity computing means is changed over into a second nature fuel computing means in accordance with an operating condition detected by the operating condition detecting means (Refer to FIG. 1).

Explanation will be made of a specific example of the present invention. It is estimated for example that the first nature fuel quantity computing means is the one for computing a quantity of a heavy fuel while the second nature fuel quantity computing means is the one for computing a quantity of a light fuel. At an extremely initial stage of an engine start, the fuel computing means for the heavy fuel, that is, the first nature fuel quantity computing means is used in order to satisfy a starting performance. Further, after the engine start, when the engine operating condition satisfies a predetermined engine operating term, that is, for example, when a complete detonation is confirmed or completion of the engine start is determined, it is changed over into the fuel computing means for the light fuel even though the fuel which is used at present has any nature.

Thus, the fuel quantity is computed by the fuel quantity computing means for a heavy fuel at an extremely initial stage of an engine start while a fuel quantity is forcibly computed by the fuel quantity computing means for a light fuel after, for example, a complete detonation. Thus, a starting performance can be satisfied if a heavy fuel is at present used, and further, deterioration of exhaust emission characteristics can be minimized even through a light fuel is at present used. It is noted that although it would be considered that the exhaust emission characteristics deteriorate more or less in the case of using the light fuel at present since the fuel quantity computing means for a heavy fuel is used even at an extremely initial stage of an engine start, indeed, the deterioration of the exhaust emission characteristics can be minimized due to the following reasons (Refer to FIG. 14).

Referring to FIG. 14 which shows results of measurements for post combustion (exhaust) air-fuel ratios up to 40 cycles after an engine start in such a condition that a fuel injection quantity until a complete detonation (2 cycles after the engine start) is alone increased (increment is changed at four stages), and the fuel injection quantity is set to a substantially same value in all various states after the detonation, it is understood that the post combustion air-fuel ratio varies within 40 cycles after the engine start. This is because a substantial quantity of the fuel fed up to the complete detonation forms a wall stream in an intake passage (an intake port), and is then evaporated as the air pressure in the intake passage is lowered and the temperature of the intake valve, the intake passage and the like is increased after complete detonation, before it flows into a cylinder (combustion chamber) for combustion. The above-mentioned founding shows that the substantial part of the fuel injected up to a complete detonation flows into the combustion chamber for combustion after the complete detonation even though the fuel quantity is set to a heavy fuel up to the complete detonation, and accordingly, in view of this inflow quantity, the deterioration of exhaust emission characteristics can be minimized by setting the fuel quantity to a value which is optimum for a light fuel after the complete detonation even though the light fuel is used.

Meanwhile, in the case of using a heavy fuel at present, should the fuel quantity be forcibly changed into a value for a light fuel after a complete detonation, the air-fuel ratio would be lean, and as a result, the stability (as to stable combustion and the like) would be deteriorated. In this case, the deterioration of the stability is inhibited by configurations stated in ninth to thirteenth aspects of the present invention. As stated above, if the fuel quantity is computed under setting of a heavy fuel in such a condition that a light fuel is used at present, no substantial difference in generated torque is appreciated even though the air-fuel ratio becomes merely rich, and accordingly, it is fundamentally difficult to determine whether the fuel used at present is heavy or not. On the contrary, if the fuel quantity is computed under setting of a light fuel in such a condition that a heavy fuel is used at present, the air-fuel ratio becomes lean so that the generated torque relatively decreases, and accordingly, it is possible to easily determine whether the fuel nature is heavy or not.

According to a second aspect of the present invention, there is provided an engine control apparatus in which the above-mentioned operating condition detecting means detects at least one of an engine speed, an elapsed-time after an engine start, a number of cycles after an engine start, a pressure in an intake passage, a total intake air quantity after an engine start, an intake air temperature, an engine cooling water temperature and an air-fuel ratio, and if a detected engine operating condition satisfies a predetermined term, the first nature fuel quantity computing means is changed over into the second nature fuel quantity computing means (Refer to FIG. 2).

Namely, for example, it is specifically stated that an engine speed or the like is used for determining whether a term of forcible change-over from the first nature fuel quantity computing means into the second nature fuel quantity computing means is satisfied or not.

According to a third aspect of the present invention, there is provided an engine control apparatus, in which the second nature fuel quantity computing means is adapted to compute a fuel quantity which is smaller than that computed by the first nature fuel quantity computing means (Refer to FIG. 3).

Namely, it is specifically stated that the first nature fuel quantity computing means is used for a fuel having a low evaporation rate (a heavy fuel) while the second nature fuel quantity computing means is used for a fuel having a high evaporation rate (a light fuel).

According to a fourth aspect of the present invention, there is provided an engine control apparatus in which, a fuel quantity is computed by the first nature fuel quantity computing means if the engine speed is lower than a predetermined value after an engine start or if an elapsed time after an engine start is shorter than a predetermined time, and a fuel quantity is computed by the second nature fuel quantity computing means if the engine speed becomes higher than the predetermined value after the engine start, or if the elapsed time after the engine start is longer than the predetermined time (Refer to FIG. 4).

Namely, it is exemplified that a condition of, for example, forcible change-over from the first nature fuel quantity computing means into the second nature fuel quantity computing means, and the engine speed at which the change-over should be made (the predetermined value) is about 600 to 1,000 rpm. Further, the elapsed time by which the change-over should be made after an engine start, is about 0.8 to 1.5 sec.

According to a fifth aspect of the present invention, there is provided an engine control apparatus comprising an air quantity detecting/estimating means for directly or indirectly measuring a quantity of air introduced into a cylinder, and a basic fuel quantity computing means for computing a fuel quantity from an air quantity obtained by the air quantity detecting/estimating means, the above-mentioned first nature fuel quantity computing means including a first nature fuel quantity increment means, for carrying out an increment correction of the fuel quantity computed by the basic fuel quantity computing means, and the above-mentioned second nature fuel quantity computing means including a second fuel quantity increment means for fuel nature, for carrying out increment correction by a value smaller than that carried by the first nature fuel quantity increment means (Refer to FIG. 5).

Namely, after an intake air quantity is detected, a basic fuel quantity serving as a fuel quantity corresponding to, for example, a theoretical air-fuel ratio is computed from the detected intake air quantity, and in view of this basic fuel quantity, the fuel increment correction for the first fuel nature is changed over into the fuel increment correction for the second fuel nature.

According to a sixth aspect of the present invention, there is provided an engine control apparatus in which the first nature fuel quantity computing means computes a fuel quantity for a heavy fuel while the second fuel quantity computing means computes a fuel quantity for a light fuel.

Namely, it is specifically stated that the first fuel nature is heavy while the second fuel nature is light, According to a seventh aspect of the present invention, there is provided an engine control apparatus in which the first nature fuel quantity computing means computes a fuel quantity for a heavy fuel while the second nature fuel quantity computing means computes a fuel quantity for a middle fuel between the heavy fuel and the light fuel.

Namely, upon the change-over from the first nature fuel quantity computing means set for a heavy fuel, into the second fuel quantity computing means, should the second fuel quantity computing means be set for a light fuel, there would be caused a risk of great deterioration of the stability upon the use of a heavy fuel. Thus, according to the present aspect of the invention, the fuel quantity computation for the second fuel is carried out under setting of a fuel which is slightly heavier than the light fuel in order to restrain the deterioration of the stability upon the use of the heavy fuel. However, it is noted that the exhaust emission characteristics are slightly deteriorated upon the use of the light fuel.

According to an eighth aspect of the present invention, there is provided an engine control apparatus in which the first nature fuel quantity computing means computes a fuel quantity for a heavy fuel, a third nature fuel quantity computing means computes a fuel quantity for a light fuel, and the second nature fuel quantity computing means computes a fuel quantity for a fuel which is lighter than the light fuel, and in which the first nature fuel quantity computing means is changed over into the second nature fuel quantity computing means in accordance with an engine operating condition detected by the operating condition detecting means, and further, the second nature fuel quantity computing means is changed over into the third nature fuel quantity computing means (Refer to FIG. 8).

Namely, as stated above, since a substantial amount of fuel injected up to a complete detonation is burnt after the complete detonation, it is required to take the inflow of fuel injected up to the complete detonation into consideration for the computation of a fuel quantity by the second nature fuel quantity computing means into which the first nature fuel quantity computing means has been changed over, and in this case, the consideration is taken such that the setting of a fuel should be made so as to set a fuel which is lighter than the light fuel. Further, of all fuel injected up to the complete detonation, the part having formed a wall stream is substantially burnt within about forty cycles as shown in FIG. 14, and accordingly, it is further changed over thereafter into the third nature fuel quantity computing means, that is, for the setting of a light fuel, thereby it is possible to optimize the air-fuel ratio (exhaust).

According to a ninth aspect of the present invention, there is provided an engine control apparatus including a fuel nature determining means for determining a nature of a fuel, in which when the fuel nature determining means determines that the nature of fuel is heavier than the second fuel nature after change-over from the first nature fuel quantity computing means into the second nature fuel quantity computing means, it is changed over into the first nature fuel quantity computing means (Refer to FIG. 7).

As already explained in the first aspect of the invention, in the case of using a heavy fuel at present, by forcible change-over into a fuel quantity for a light fuel after complete detonation, the combustion air-fuel ratio becomes lean, resulting in a risk of deterioration of the stability. Thus, in this aspect, a function for inhibiting deterioration of the stability is added. That is, a means for determining whether a fuel used at present is heavy or not after the change-over into the second nature fuel quantity computing mean (for the setting of a light fuel) is added. When the fuel nature determining means determines that the fuel used at present is heavy, it is changed over into the setting of a heavy fuel, that is, it is changed over into the first nature fuel quantity computing means. As to a system for determining a nature of a fuel, which will be hereinbelow explained in tenth to thirteenth aspects of the present invention, it is fundamentally difficult to determining whether the fuel nature is heavy or not in such a case that a fuel quantity is computed under setting of a heavy fuel in a condition in which a light fuel is used at present, since only the air-fuel ratio becomes rich but a produced torque does not largely vary. On the contrary, if a fuel quantity is computed under setting of a light fuel in a condition in which a heavy fuel is used at present, the air-fuel ratio becomes lean so as to lower the produced torque, and accordingly, it is easy to determine whether the fuel nature is heavy or not.

According to a tenth aspect of the present invention, there is provided an engine control apparatus in which the fuel nature determining means determines a nature of a fuel in accordance with at least one of an engine speed, an elapsed time until the engine turns up to a predetermined rotating angle, and an air-fuel ratio.

According to an eleventh aspect of the present invention, there is provided an engine control apparatus in which the fuel nature determining means determines a nature of a fuel in accordance with a first derivative or a second derivative of an engine speed or an elapsed time until the engine turns up to a predetermined rotating angle.

According to a twelfth aspect of the present invention, there is provided an engine control apparatus in which the fuel nature determining means compares the first derivative with a predetermined value so as to determine a fuel nature in accordance with whether the former is larger or smaller than the latter.

According to a thirteenth aspect of the present invention, there is provided an engine control apparatus in which the fuel nature determining means compares the second derivative with a predetermined value so as to determine a nature of a fuel in accordance with whether the former is larger or smaller than the latter.

That is, as shown in FIG. 8, a first derivative or a second derivative of, for example, an engine speed or an elapsed time until the engine turns by a predetermined rotating angle (a required rotating time) is evaluated, thereby it is possible to detect a lowering of the torque caused by rarefaction of the fuel-air fuel ratio. In this case, as understood from FIG. 8, it is noted that both lowering of the torque and recovering of the torque thereafter may be detected.

Further, as stated in the tenth aspect of the present invention, the fuel nature may be determined in accordance with, for example, a responsiveness from the fuel injection to the combustion (exhaust) air-fuel ratio.

According to a fourteenth aspect of the present invention, there is provided an engine control apparatus which comprises a fuel nature confirming means for confirming a nature of a fuel which is used at present in such a way that after the second nature fuel quantity computing means is changed over into the first nature fuel quantity computing means since the fuel nature determining means determines that the fuel nature is heavier than the second fuel nature, the nature of the fuel is again determined by the fuel nature determining means (Refer to FIG. 9).

Namely, as explained in the first to ninth aspects of the present invention, should the fuel used at present be heavy, the combustion fuel-air ratio would become lean by forcible change-over into a fuel quantity for a light fuel after a complete detonation, resulting in occurrence of a risk of deterioration of the stability. However, it is noted at this stage that the deterioration of the stability would be caused by another factor, other than the rarefaction of the air-fuel ratio caused by a heavy fuel. Thus, after the change-over into the setting of a heavy fuel, or into the first nature fuel quantity computing means, the fuel nature is again determined by the system stated in the tenth to thirteenth aspect of the present invention, and after the change-over into the first nature fuel quantity computing means, determination (confirmation or recognition) is made such that the fuel is indeed heavy if, for example, variation in engine speed is settled. If, for example, variation in engine speed is unsettled even after the change-over into the first nature fuel quantity computing means, it is considered that the stability is lowered due to a cause other than setting of a heavy fuel.

According to a fifteenth aspect of the present invention, there is provided an engine control apparatus in which if the result of determination by the fuel nature determining means after the change-over from the second nature fuel quantity computing means into the first nature fuel quantity computing means varies from a result of previous determination, the fuel nature confirming means recognizes that the nature of the fuel used at present is heavy (Refer to FIG. 10).

That is, as stated in the fourteenth aspect of the present invention, if the fuel used at present is heavy, the result of first time determination of a fuel nature which is carried out during computation of a fuel quantity for the second fuel nature is different from the result of second time determination of a fuel nature which is carried out after the rechange-over into the first nature fuel quantity computing means. Thus, if the result of determination after the change-over is different from the result of determination previously carried out, it is possible to recognize that the nature of the fuel used at present is heavy.

According to a sixteenth aspect of the present invention, there is provided an engine control apparatus in which a control parameter for an engine is computed from a nature of a fuel used at present, which is determined by the fuel nature determining means (Refer to FIG. 11).

Namely, in the case of determination of the nature of the fuel used at present by the fuel nature determining means, the engine control parameter such as an ignition timing, a fuel injection quantity, or a fuel injection timing is computed from the thus recognized fuel nature. Thus, optimum control is carried out in accordance with the fuel nature.

According to a seventeenth aspect of the present invention, there is provided an engine control apparatus in which the engine control parameter computing means computes a control parameter for controlling a respective cylinder, or a control parameter for uniformly controlling all cylinders.

According to an eighteenth aspect of the present invention, there is provided an engine control apparatus in which the fuel nature determining means determines a nature of a fuel used at present in view of a behavior of engine speed until a predetermined time elapses from an initial stage of a start of an engine.

That is, for example, a predetermined correlation have been known among a predetermined time up to an initial detonation during a start of the engine, a behavior of engine speed blow-up subsequent to the initial detonation and a fuel nature. The fuel nature is determined in view of both result of determination based upon the correlation and result of determination by using an engine speed or the like as stated in the tenth to thirteenth aspects, thereby it is possible to enhance the degree of accuracy of the determination.

According to a nineteenth aspect of the present invention, there is provided an engine control apparatus in which a parameter such as a determination threshold value used in the fuel nature determining means is adjusted, being based upon a behavior of engine speed until a predetermined time elapses from the initial stage of a start of an engine.

Namely, as stated above, a predetermined correlation have been known among a predetermined time up to an initial detonation during a start of the engine, a behavior of engine speed blow-up subsequent to the initial detonation and a fuel nature. From a result of determination with the use of the correlation, if, for example, the fuel highly possibly seems to be heavy, a parameter used in the fuel nature determining means, such as a determination threshold value is lowered so as to obtain the results of determination at an early time.

According to a twentieth aspect of the present invention, there is provided an engine control apparatus in which the operating condition detecting means detects an intake air quantity, a fuel injection quantity and an exhaust air-fuel ratio as operating conditions after a start of an engine (Refer to FIG. 12).

Namely, as shown in FIG. 14, a substantial part of the fuel fed up to a complete detonation forms a wall stream in an intake passage, and accordingly, it is evaporated when the air pressure in the intake passage is lowered and the temperature of an intake valve, the intake passage and the like is increased, and then it flows into a combustion chamber so as to be burnt. This event continues within about forty cycles after a start of the engine. This behavior is onboard detected from a supply air-fuel ratio and an exhaust air-fuel ratio which are computed from a fuel injection quantity and an air quantity while a timing with which the first nature fuel quantity computing means is changed over into the second nature fuel quantity computing means is made to be appropriate.

According to a 21st aspect of the present invention, there is provided an engine control apparatus in which the fuel quantity computing means are changed over without depending upon a nature of a fuel used at present in the respective aspects of the present invention stated above.

That is, as discussed hereinabove, the fuel quantity computing means are changed over if a predetermined term is satisfied after a start of an engine, irrespective of a nature of a fuel used at present, that is, for example, the fuel quantity computing means for a heavy fuel is forcibly changed over into the fuel quantity computing means for a light fuel. Thus, with the use of the engine control apparatus according to the present invention, the behavior stated in the fifteenth aspect of the present invention can be observed.

Meanwhile, an automobile according to the present invention, is installed thereon with the engine control apparatus as stated above.

With the configuration of the present invention, upon a start of an engine, the fuel computing means for a heavy fuel is used in order to satisfy a starting performance, and after the start of the engine, the fuel quantity computing means for a heavy fuel is changed over into the fuel quantity computing means for a light fuel, irrespective of a nature of a fuel used at present, when an operating condition of the engine satisfies a predetermined term, that is, for example, a complete detonation is confirmed. Accordingly, if the heavy fuel is used at present, the starting performance can be satisfied while if the light fuel is used at present, deterioration of exhaust emission characteristics can be minimized. Thus, stability and constant exhaust emission characteristics can be ensured and maintained even though a nature of a fuel used at present is unsure, thereby it is possible to provide an engine control apparatus which is robust among different fuel natures.

Detailed explanation will be made of preferred embodiments of the present invention with reference to the accompanying drawings in which:

BRIEF DESCRIPTION OF THE SEVERAL VIEWS OF THE DRAWING

FIG. 8 is a view for explaining tenth to thirteenth aspects of an engine control apparatus according to the present invention;

DETAILED DESCRIPTION OF THE INVENTION

Figure 15:
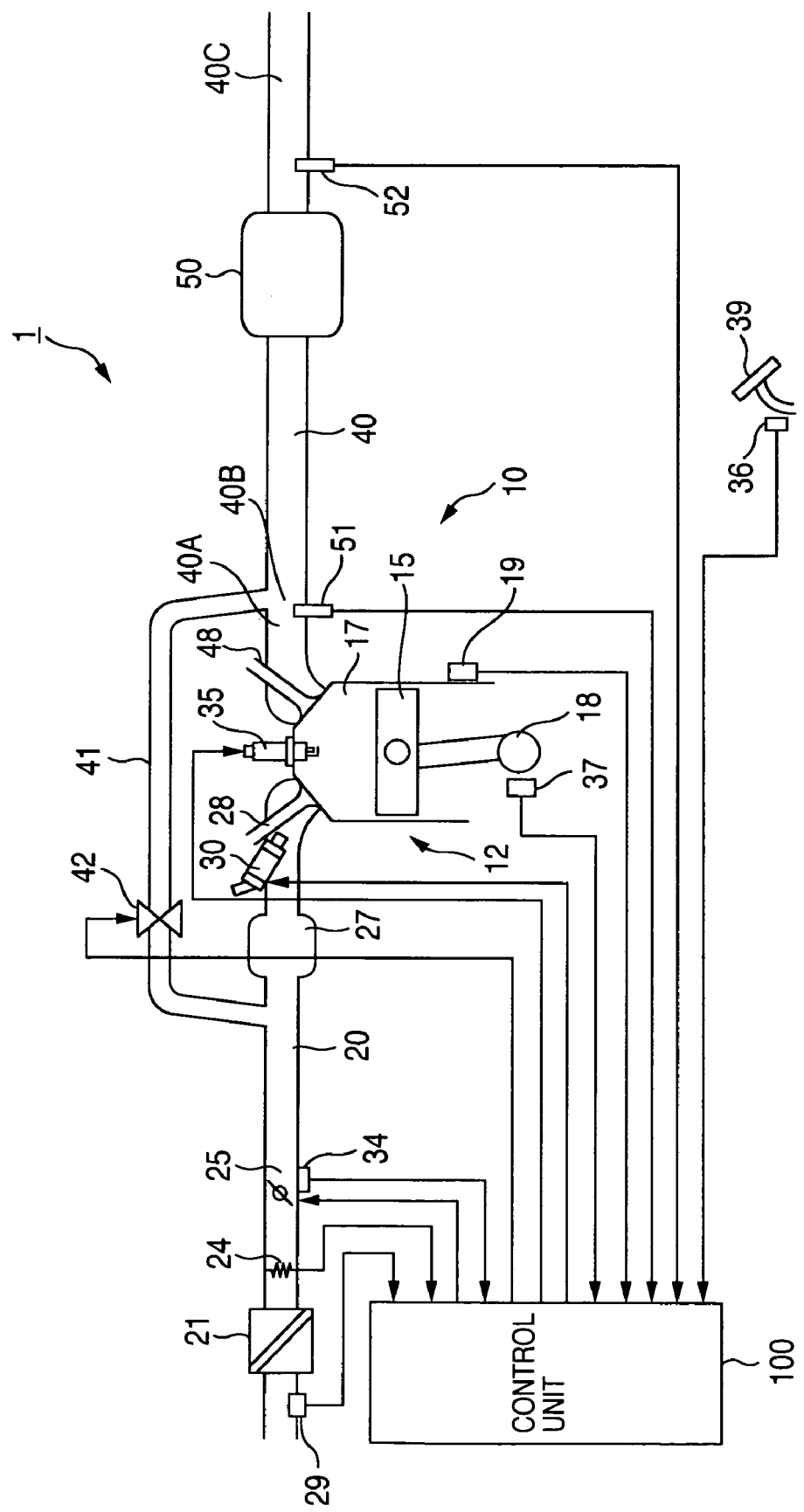
FIG. 15 is a schematic view illustrating an engine applied with each of the aspects of an engine control apparatus according to the present invention.

Explanation will be hereinbelow made of several embodiments of the engine control apparatus of the present invention with reference to the accompanying drawings:

Referring to FIG. 15 which is a schematic view illustrating an embodiment (which is common to various embodiments) of the engine control apparatus according to the present invention together with an vehicle onboard engine in which the engine control apparatus is applied, the illustrated engine 10 is a multi-cylinder engine having, for example, four engine cylinders #1, #2, #3 and #4 (Refer to FIG. 17), each 12 of the cylinders #1, #2, #3 and #4 being slidably fitted therein with a piston 15, defining therein a combustion chamber 17 above the piston 15 and incorporating a spark plug 32 confronting the combustion chamber 17 in each of the cylinders #1, #2, #3 and #4.

The air for burning a fuel is taken into an air-cleaner 21 provided in an upstream end part of an intake passage 20, flowing through an airflow sensor 24 and an electronic control throttle valve 25 and then into a collector 27 from which the air is sucked into the combustion chamber 17 of each of the cylinders #1, #2, #3 and #4 by way of an intake value 28 provided in a downstream end part of the intake passage 20.

Further, a fuel injection valve 30 is arranged in the downstream part (intake port) of the intake passage 20.

A mixture of the air sucked into the combustion chamber 17 and a fuel injected from the fuel injection valve 20 is burnt by spark ignition of the spark plug 35, and the combustion waste gas (exhaust gas) thereof is discharged into respective passage parts 40A (Refer to FIG. 17) formed in the upstream part of an exhaust passage 40 by way of an exhaust valve 48 from the combustion chamber 17. Then, the combustion waste gas is led from the respective passage parts 40A, flowing through an exhaust manifold portion 40B, into ternary catalyst 50 provided in the exhaust passage 40 through which it is purified, and is discharged outside.

Further, an oxygen sensor 52 is provided in the exhaust passage 40, downstream of the ternary catalyst 50, and an A/F (air-fuel ratio) sensor 51 is also arranged in the exhaust manifold part 40B of the exhaust passage 40, upstream of the ternary catalyst 50.

The air-fuel ratio sensor 51 has a linear output characteristic with respect to a density of oxygen contained in exhaust gas. The relationship between the density of oxygen in exhaust gas and the air-fuel ratio is substantially linear, and accordingly, by detecting an oxygen density with the use of the air-fuel ratio sensor 50, the air-fuel ratio in the exhaust manifold part 40B can be obtained. A control unit 100 (which will be detailed later) computes an air-fuel ratio upstream of the ternary catalyst 50 from a signal delivered by the air-fuel ratio sensor 51, and computes, from a signal delivered by the oxygen sensor 52, whether it is rich or lean with respect to an oxygen density or a stoichiometry downstream of the ternary catalyst 50. Further, with the use of outputs from both sensors 51, 52, F/B control is carried out for sequentially correcting a fuel injection quantity or an air quantity so as to optimize the purifying efficiency of the ternary catalyst 50.

Further, a part of exhaust gas discharged into the exhaust passage 40 from the combustion chamber 17, is led, as required, into an EGR passage 41, then is led into the intake passage 20, and thereafter, is recirculated into the combustion chamber 17 in each of the respective cylinders by way of a branch passage part of the intake passage 20. The EGR passage 41 incorporates an EGR valve 42 for adjusting an EGR rate.

Further, the engine control apparatus 1 in this embodiment incorporates a control unit 100 incorporating a microcomputer, for carrying out various control of the engine 10.

Figure 16:
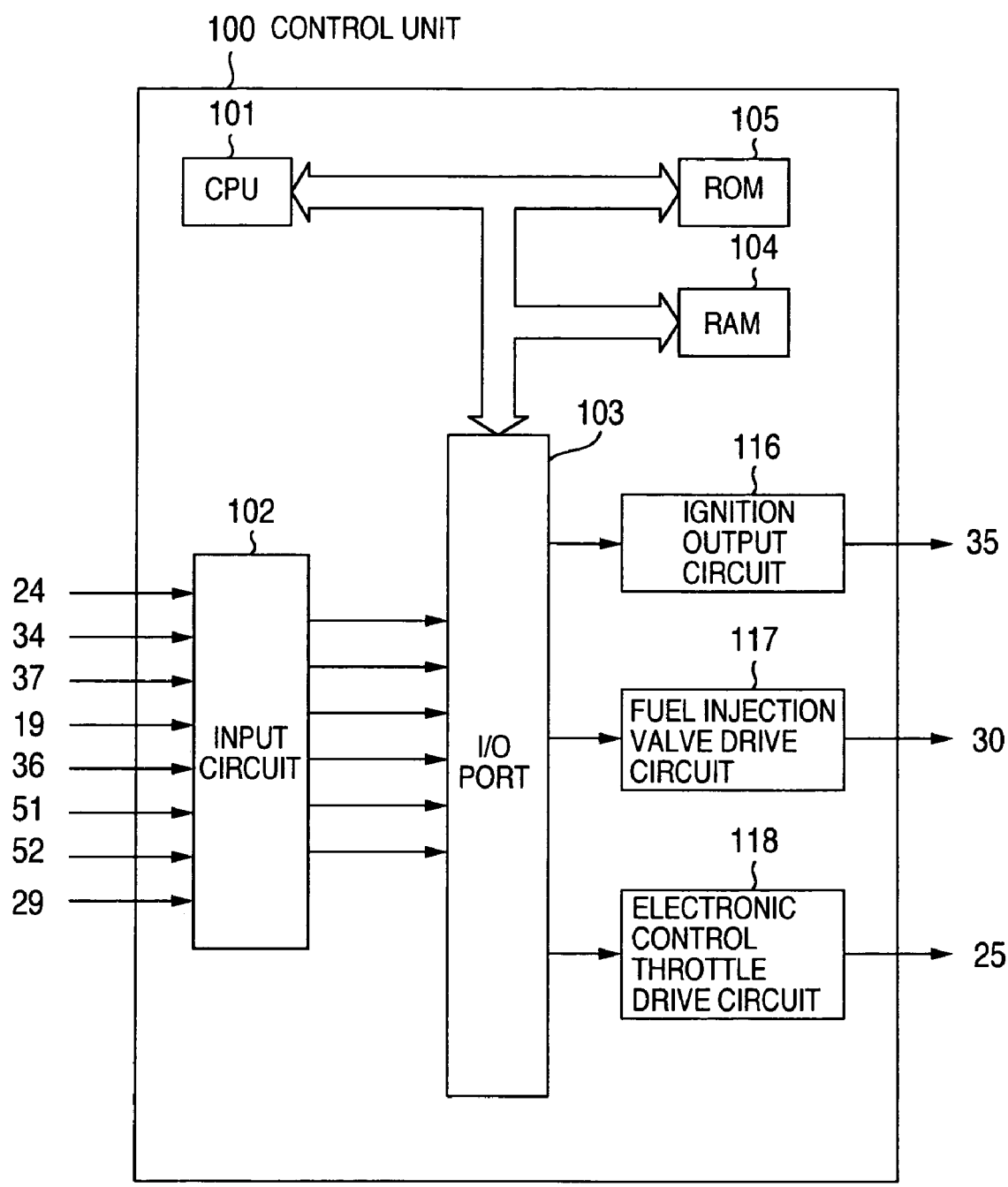
FIG. 16 is a view illustrating an internal configuration of a control unit in a first embodiment of the present invention.

As shown in FIG. 16, the control unit is basically composed of a CPU 101, an input circuit 102, an input/output circuit 103, a RAM 104, a ROM 105 and the like.

Several input signals are delivered to the control unit 100, that is, a signal corresponding to an intake air quantity detected by the air-flow sensor 24, a signal corresponding to an opening degree of the throttle valve 25 detected by a throttle sensor 34, a signal indicating a rotating speed (engine speed) and a phase of a crankshaft 18 detected by a crank angle sensor (rotating speed sensor) 37 (which delivers a signal pulse, for example, at every one rotating angle), a signal indicating whether an air-fuel ratio is rich or lean with respect to an oxygen density or a stoichiometry downstream of the ternary catalyst 50, which is detected by the oxygen sensor 52 provided in the exhaust passage 40 downstream of the exhaust catalyst 50, a signal corresponding to an oxygen density (air-fuel ratio) detected by the air-fuel ratio sensor 51 arranged in the exhaust manifold part 40B in the exhaust passage 40, upstream of the ternary catalyst 50, a signal corresponding to an engine cooling water temperature detected by a water temperature sensor provided in the cylinder 12, a signal delivered from an accelerator sensor 36 and corresponding to a degree of depression of an accelerator pedal 9 (a demand torque by a driver), and the like.

The control unit 100 which receives output signals from various sensors such as the air-fuel ratio sensor 51, the oxygen sensor 52, the crank angle sensor 37, the throttle sensor 34, the air flow sensor 24, the water temperature sensor 19, the accelerator sensor 36 and the like, recognizes an operating condition of the engine in view of these output signals, and computes main control parameters for the engine, such as an intake air quantity, a fuel injection quantity and an ignition timing. The fuel injection quantity computed by the control unit 100 is converted into a valve opening pulse signal which is transmitted to the fuel injection valve 30 by way of a fuel injection valve drive circuit 117. Further, an ignition output circuit 116 delivers a drive signal to the spark plug 35 for ignition with the ignition timing computed by the control unit 100.

In more detail, in the control unit 100, the input circuit 102 carries out signal processes such as noise rejection for an inputted signal which is then transmitted into an input/output port 103. A value of the input port is stored in the RAM 104, and is computed in the CPU 101. A control program describing the content of the computation has been beforehand written in the ROM 104. Values indicating actuator control values are once stored in the RAM 104, and are then transmitted to the input/output port 103.

As to the drive signal for the spark plug 35, a turn-on/off signal which is turned on when a primary coil in the ignition output circuit 116 is energized but turned off when the same is deenergized is set. The ignition timing corresponds to a time point at which the turn-on/off signal is changed over from its turn-on into its turn-off. The signal for the spark plug 35 set in the input/output circuit 103 is amplified by the ignition output circuit 116 so as to have a power sufficient for ignition, and is then fed to the spark plug 35. As to the drive signal (valve opening pulse signal) for the fuel injection valve 30, a turn-on/off signal which is turned on upon valve opening but turned off upon valve closing is set, and is then amplified in the fuel injection valve drive circuit 117 so as to have a power sufficient for opening the fuel injection valve 30, and is then fed to the latter. A drive signal for setting the electronic control throttle valve 25 to a desired opening degree, is transmitted to the electronic control throttle valve 25 through the intermediary of an electronic control throttle drive circuit 118.

Next, specific explanation will be made of the content carried out by the control unit 100.

First Embodiment

Figure 17:
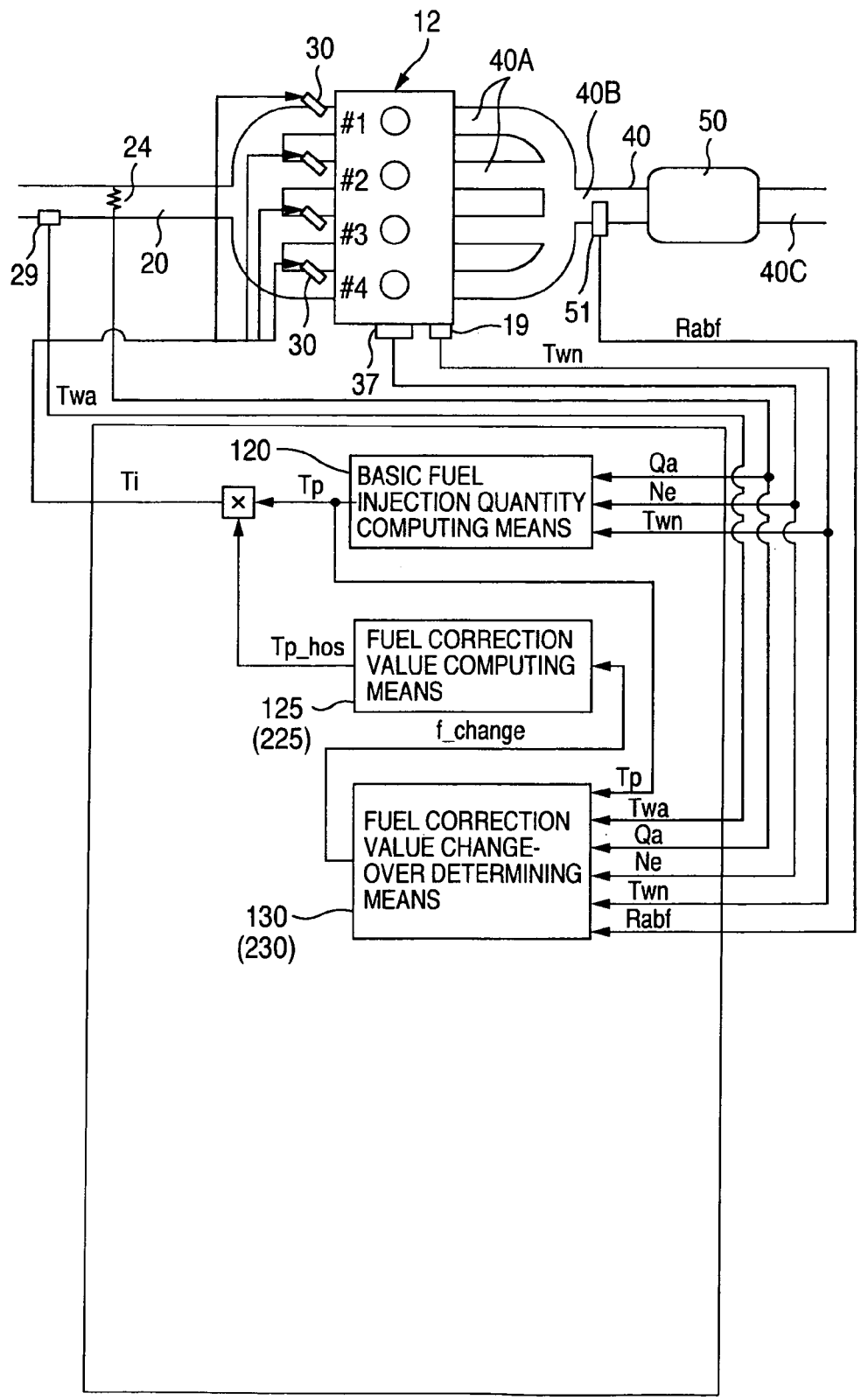
FIG. 17 is a view illustrating a control system in the first embodiment of the present invention.

Referring to FIG. 17 which is a functional block diagram and which shows a control system in a first embodiment of the present invention, the control unit 100 is composed of a computing means 120 for a basic fuel injection quantity (Tp), a computing means 125 for a fuel correction value (Tp_hos) and a fuel correction value change-over determining means 130.

In this configuration, the basic fuel injection quantity Tp is multiplied by Tp_hos computed by the fuel correction value computing means so as to obtain a fuel injection quantity Ti with which a desired air-fuel ratio is ensured in every cylinder. Tp_hos computed by the fuel correction value computing means 125 varies, depending upon a nature of a fuel. In more detail, a larger fuel injection quantity is set under the setting of a heavy fuel while a fuel quantity which is smaller than that under the setting of a heavy fuel is set under the setting of a light fuel. Change-over from the setting of a heavy fuel into the setting of a light fuel is determined by a change-over flag f_change set by the fuel correction value change-over determining means 130. Specifically, the setting of a heavy fuel is always carried out, irrespective of a nature of a fuel used at present, during an engine start, and it is forcibly changed over into the setting of a light fuel when predetermined terms (which will be detailed latter) have been satisfied after the engine start. Explanation will be hereinbelow made of the several processing means.

<Basic Fuel Injection Quantity Computing Means 120 (FIG. 18)>

Figure 18:
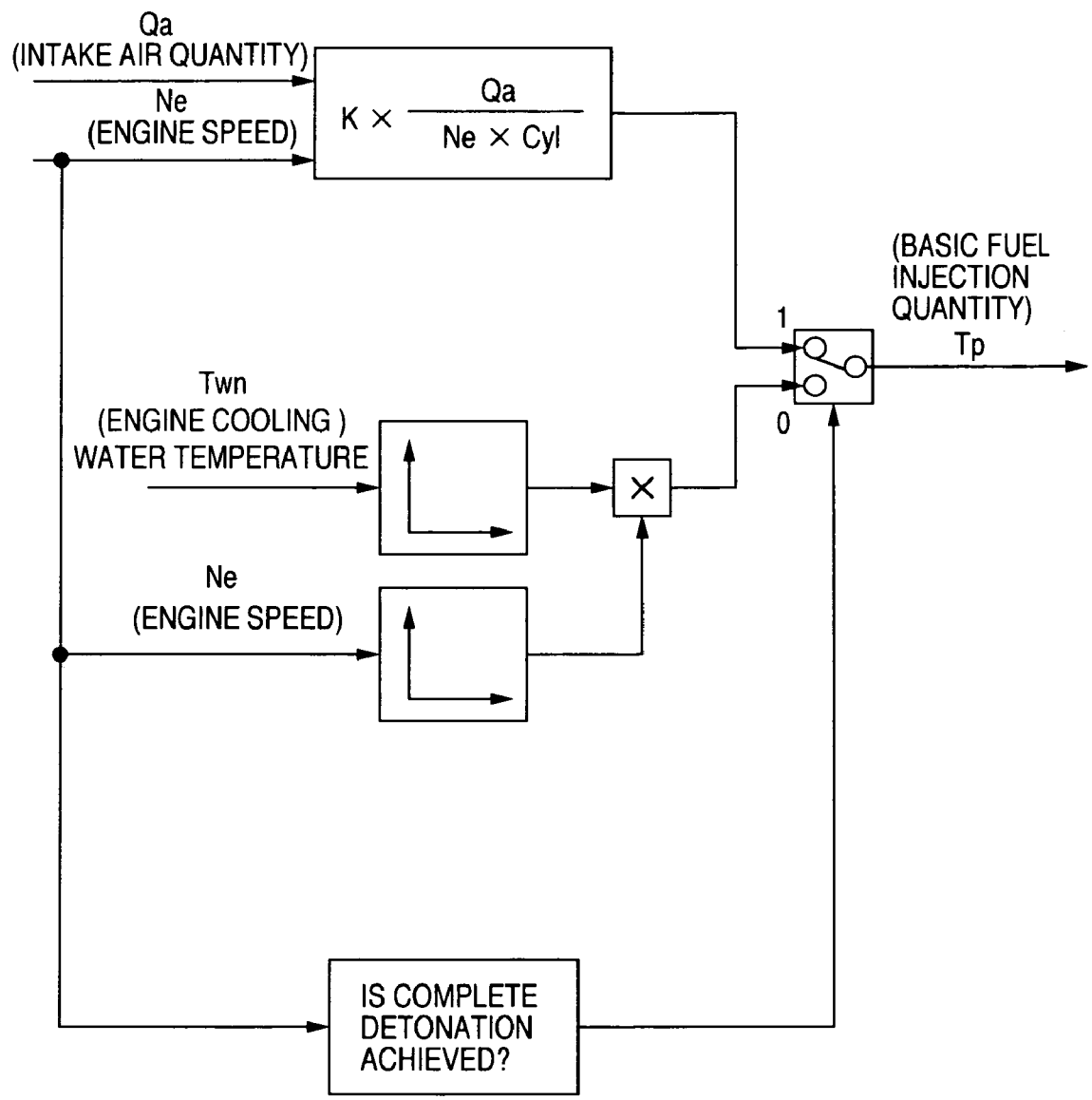
FIG. 18 is a view for explaining a basic fuel injection quantity computing means in the first embodiment of the present invention.

The basic fuel injection quantity computing means 120 computes a fuel injection quantity by which a desired torque and a desired air-fuel ratio can be simultaneously obtained in an arbitrary operating condition, from an engine intake air quantity. Specifically, as shown in FIG. 18, the basic fuel injection quantity Tp is computed. Basic fuel injection quantities are computed respectively for achievement and unachievement of complete detonation. The achievement of complete detonation can be found, for example, when the engine speed higher than a predetermined value is continued for a predetermined time period and so forth.

In the case of the unachievement of complete detonation, the basic fuel injection quantity is computed from an engine cooling water temperature (Twn) and an engine speed (Ne). It is noted that k in a computing expression for the fuel injection quantity Tp in the case of the complete detonation is a constant which is adjusted so as to always obtain a theoretical air-fuel ratio with respect to an intake air quantity. Further, cyl is a number of cylinders.

<Fuel Correction Value Computing Means 125 (FIG. 19)>

Figure 19:
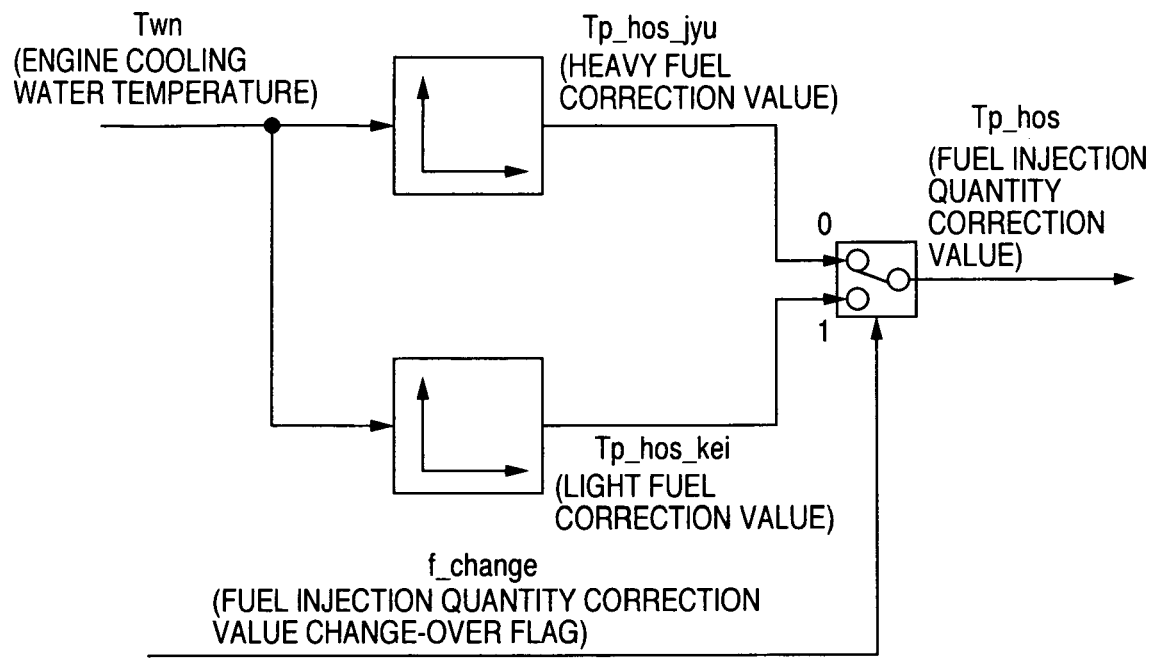
FIG. 19 is a view for explaining a fuel correction value computing means in the first embodiment of the present invention.

The fuel correction value computing means computes a fuel correction value Tp_hos. Specifically, as shown in FIG. 19, in view of the fuel injection quantity correction value change-over flag f_change, if f_change=0, a heavy fuel correction value (Tp_hos_jyu) is set, and if f_change=1, a light fuel correction value (Tp_hos_kei) is set. The heavy fuel correction value Tp_hos_jyu and the light fuel correction value Tp_hos_kei are set, as a parameter representative of the sensitivity of fuel evaporation rate, in accordance with a water temperature (Twn). Further, an intake air temperature (Twa) can be used, instead of the water temperature (Twn).

As stated above, should the setting of a heavy fuel be changed over into the setting of a light fuel in such a case that a heavy fuel is used at present, there would be caused such a risk that the stability is greatly deteriorated. However, by setting the correction value Tp_hos_key for a light fuel to be more or less heavier than the light fuel, deterioration of the stability during the use of a heavy fuel may be restrained. However, in this case, the exhaust emission characteristics during the use of a heavy fuel is deteriorated slightly.

<Fuel Correction Value Change-Over Determining Means 130 (FIG. 20)>

Figure 20:
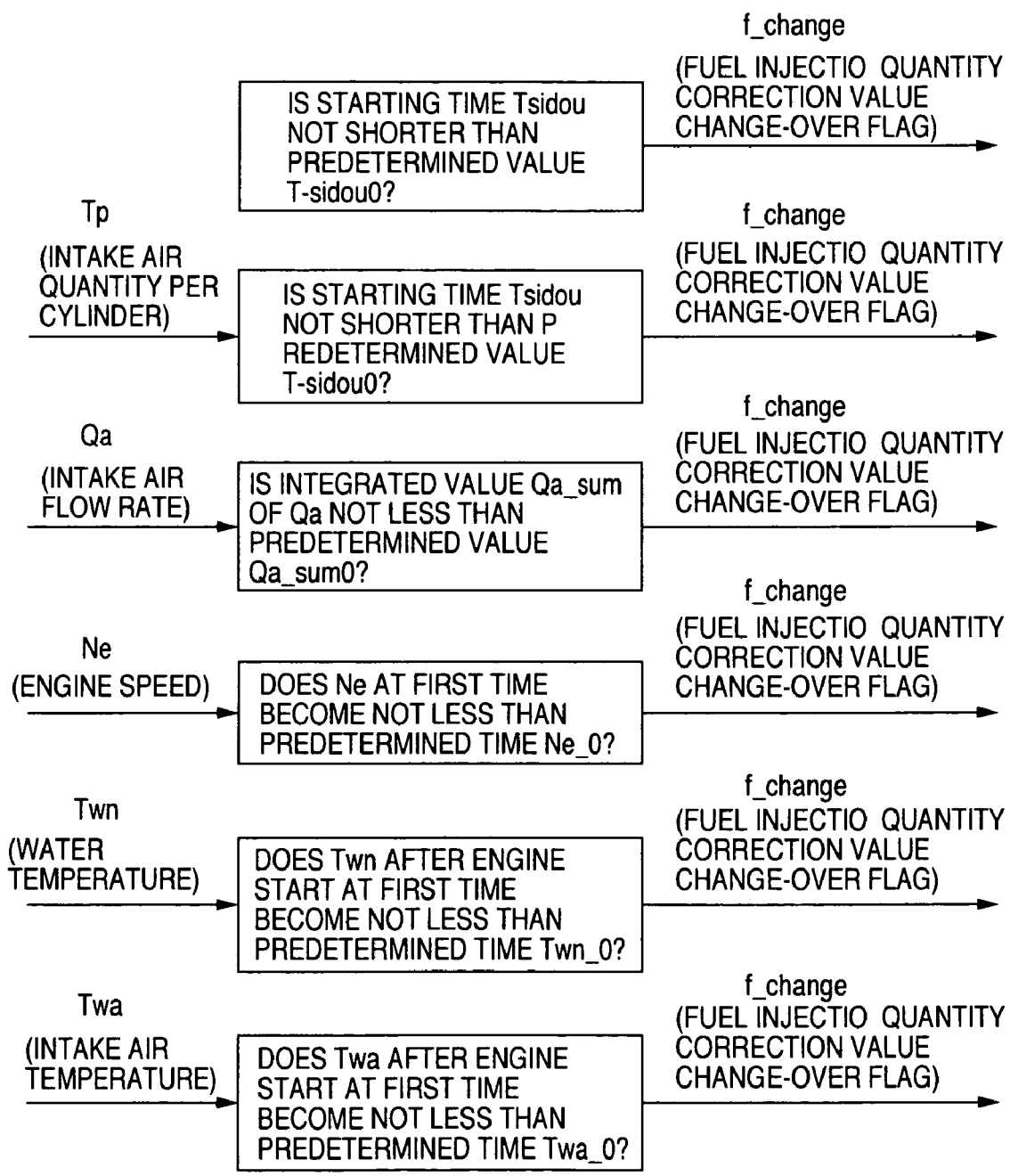
FIG. 20 is a view for explaining a fuel correction value change-over determining means in the first embodiment of the present invention.

The fuel correction value change-over determining means 130 computes the fuel injection quantity correction value change-over flag f_change. Specifically, f_change is determined in a process shown in FIG. 20. As stated above, the fuel injection quantity correction value change-over flag f_change determines a timing with which the setting of a heavy fuel is forcibly changed over into the setting of a light fuel. As to terms for determining the timing, although there may be considered several terms, the following six terms are exemplified in this embodiment, as shown in FIG. 20, that is:

Is a time Tsidou after an engine start is not less than a predetermined value T_sidou0?

Is a Tp integrated value Tp_sum after an engine start, is not less than a predetermined value Tp_sum0?

Is a integrated value Qa_sum of Qa after an engine start, is not less than a predetermined value Qa_sum0?

Does an engine speed Ne becomes at a first time not less than a predetermined value Ne_0 after an engine start?

Does Twn become at a first time not less than a predetermined value Twn_0 after an engine start?

Does Twa become at first not less than a predetermined value Twa_0 after an engine start?

The above-mentioned predetermined values may be determined by experiments. The timing with which the setting of a heavy fuel is changed over into the setting of a light fuel is preferably the timing with which an engine start is completed, and accordingly, for example, the determination of a complete detonation may be used.

Second Embodiment

In the above-mentioned first embodiment, the setting of a heavy fuel is always used during an engine start, irrespective of a nature of a fuel used at present, and when the predetermined terms have satisfied after the engine start, the change-over into the setting of a heavy fuel is forcibly carried out.

Figure 1:
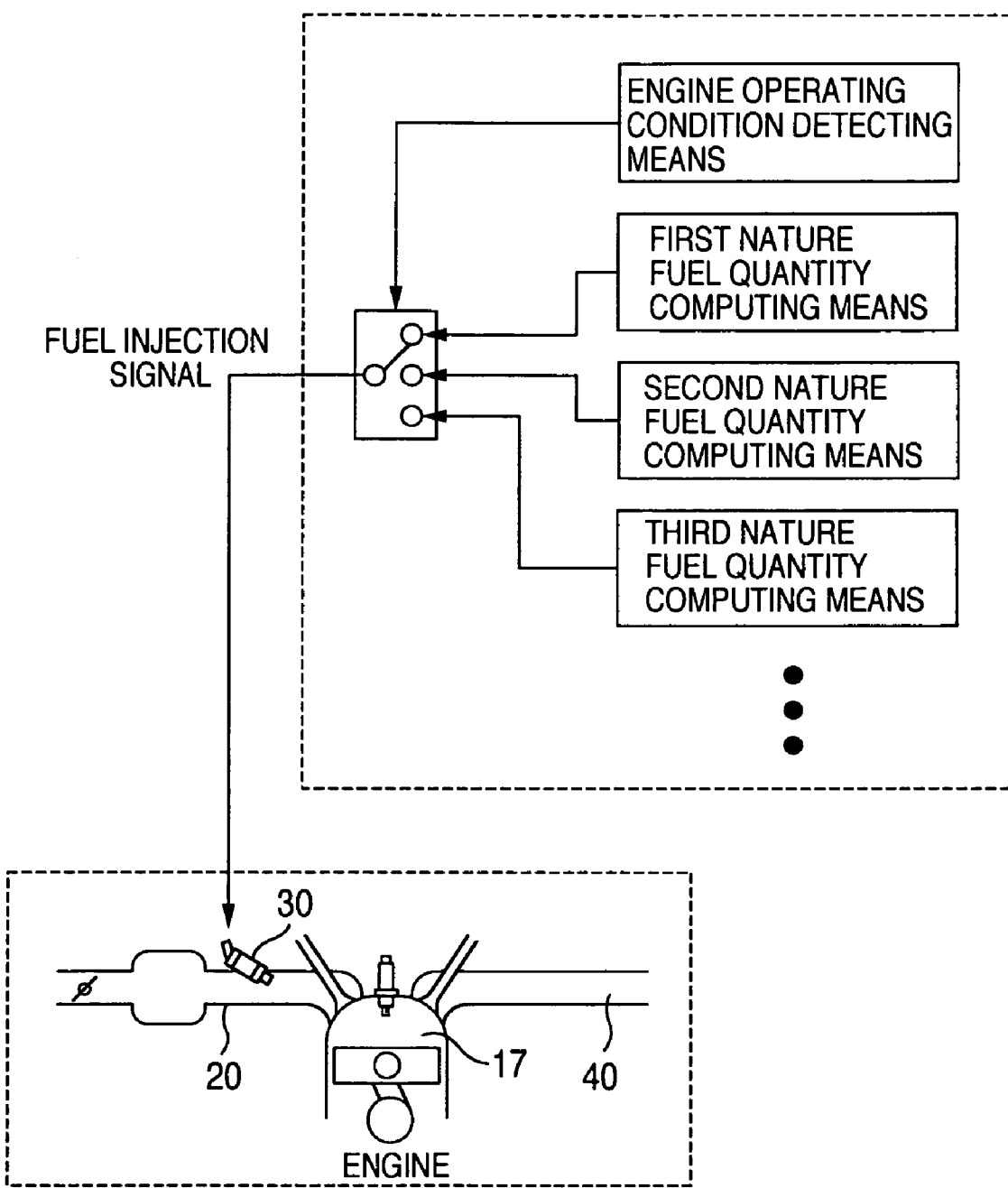
FIG. 1 is a view for explaining a first aspect of an engine control apparatus according to the present invention.
Figure 2:
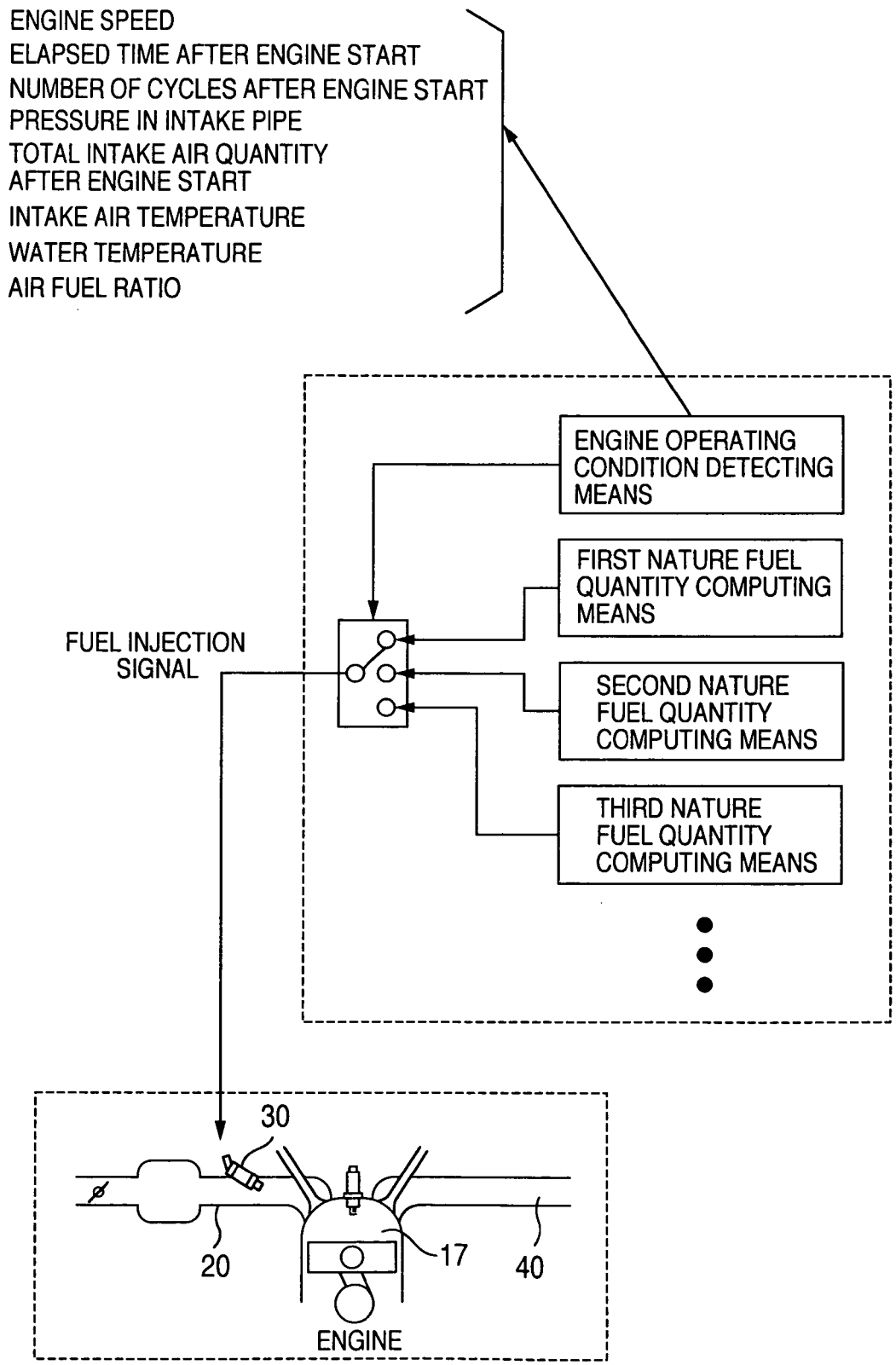
FIG. 2 is a view for explaining a second aspect of an engine control apparatus according to the present invention.
Figure 3:
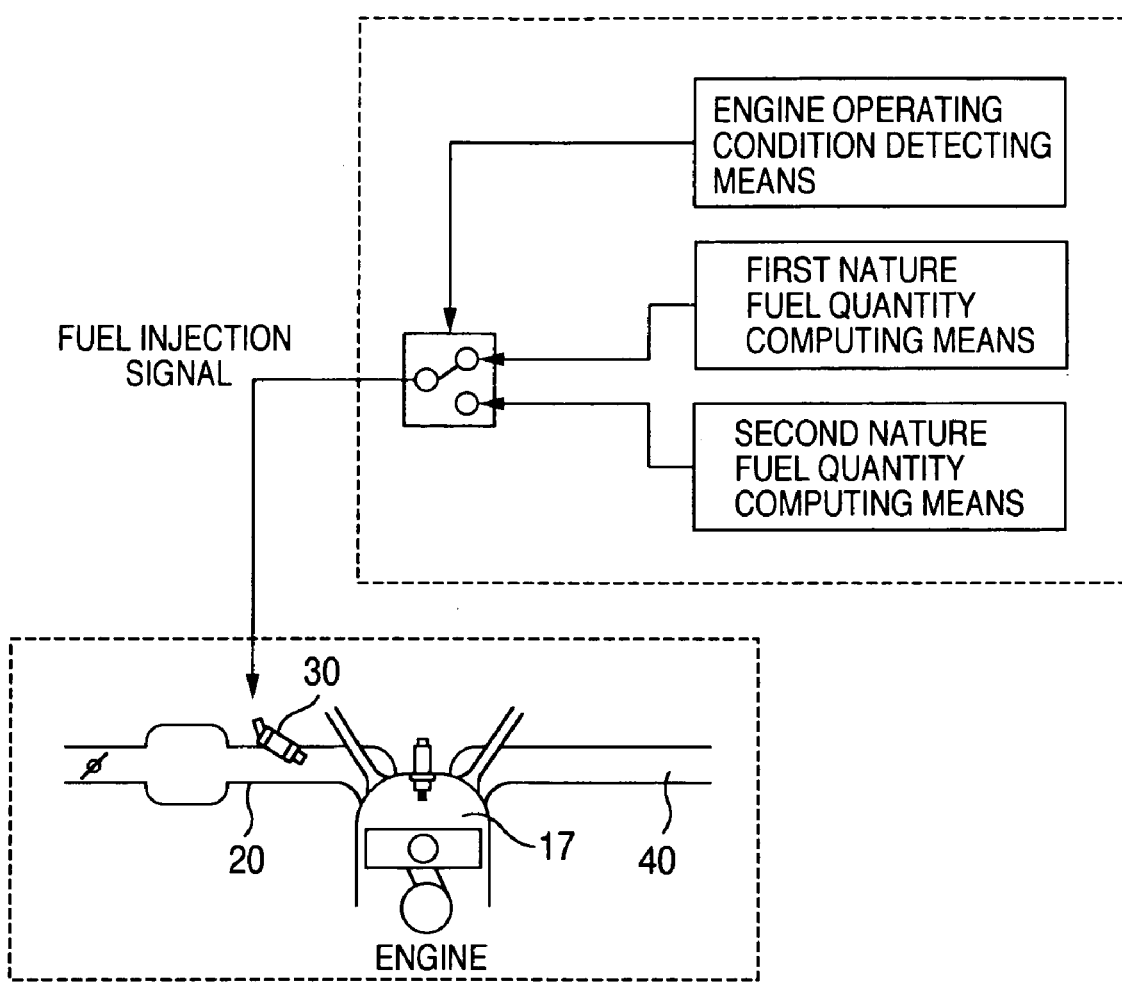
FIG. 3 is a view for explaining a third aspect of an engine control apparatus according to the present invention.
Figure 4:
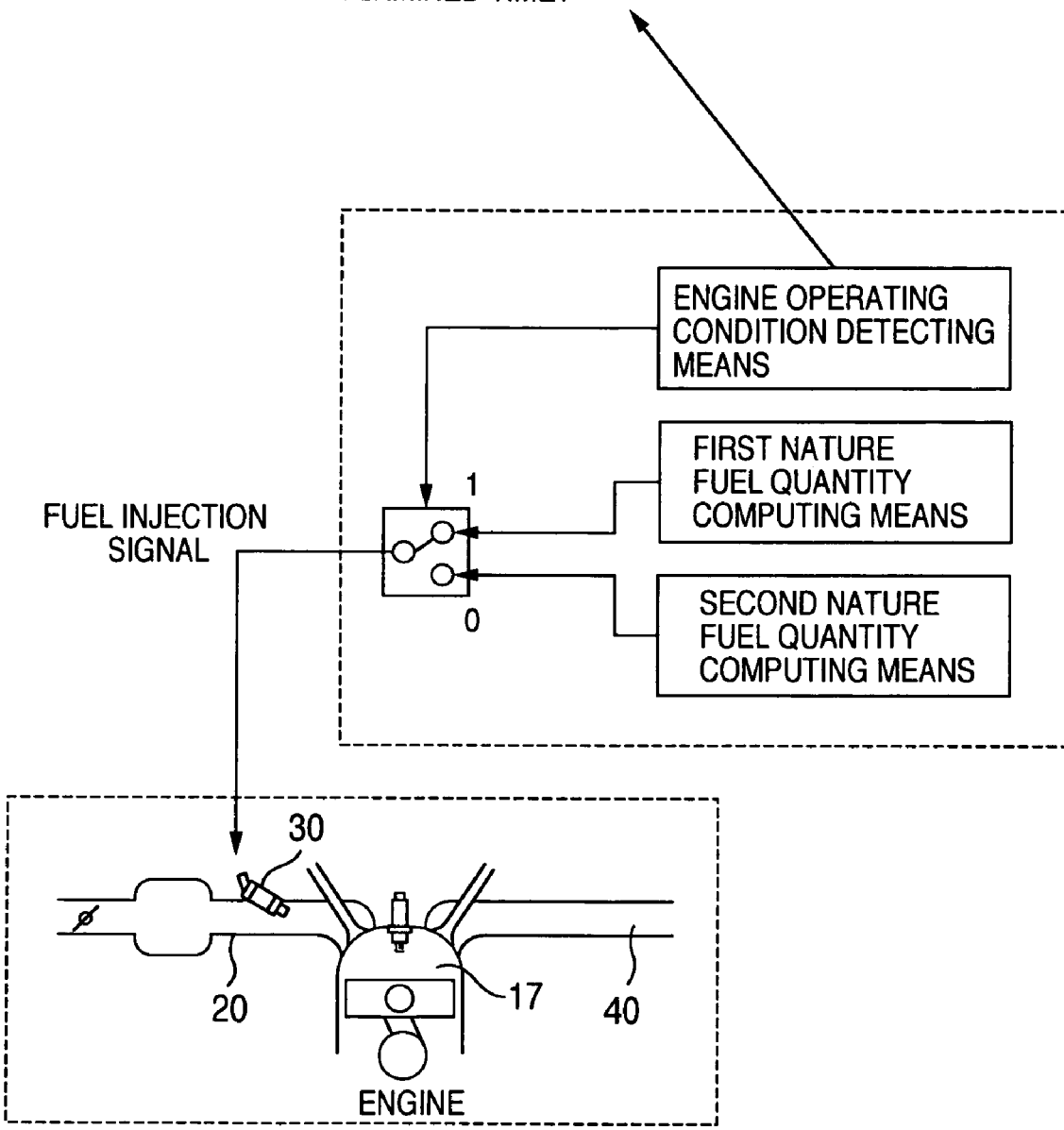
FIG. 4 is a view for explaining a fourth aspect of an engine control apparatus according to the present invention.
Figure 5:
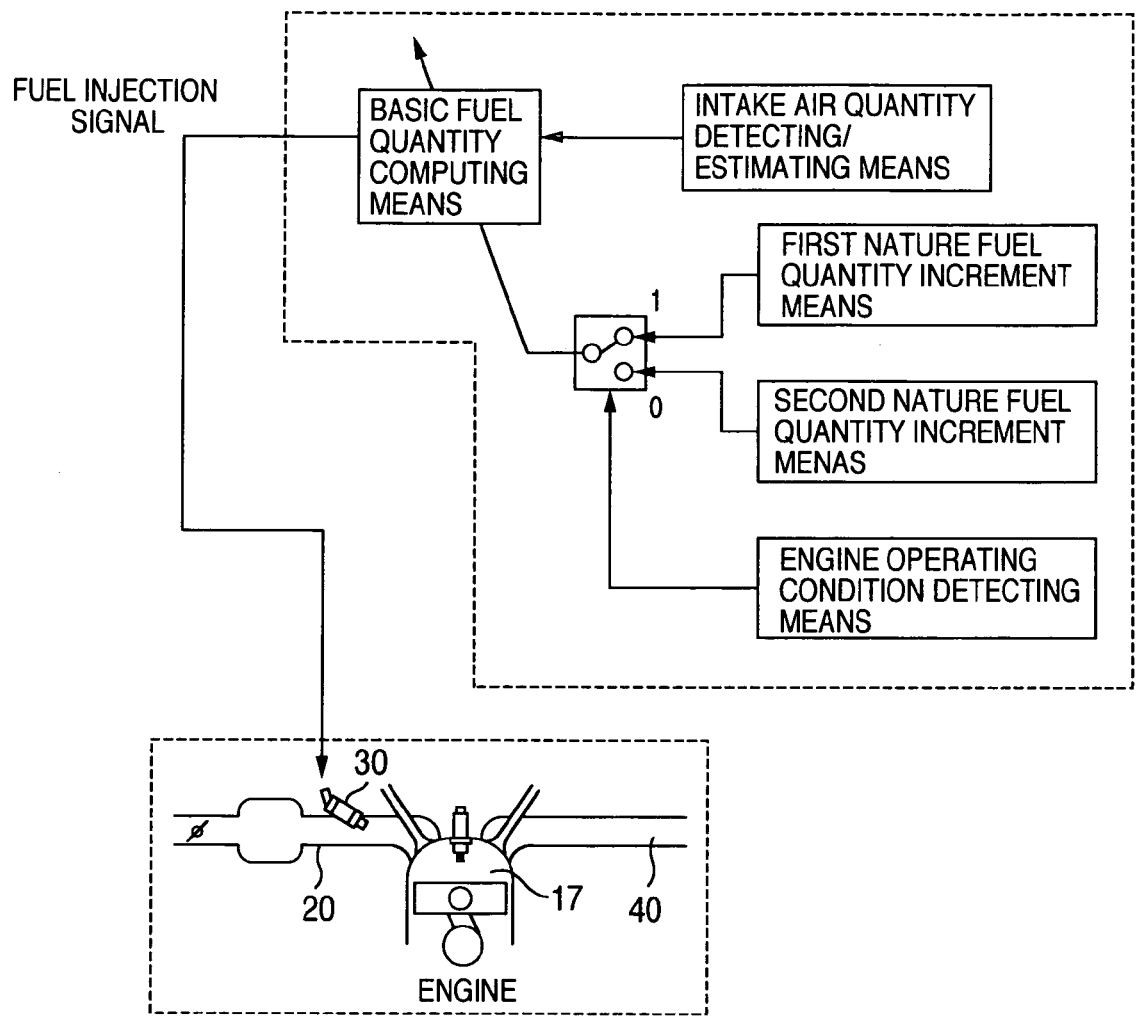
FIG. 5 is a view for explaining a fifth aspect of an engine control apparatus according to the present invention.
Figure 6:
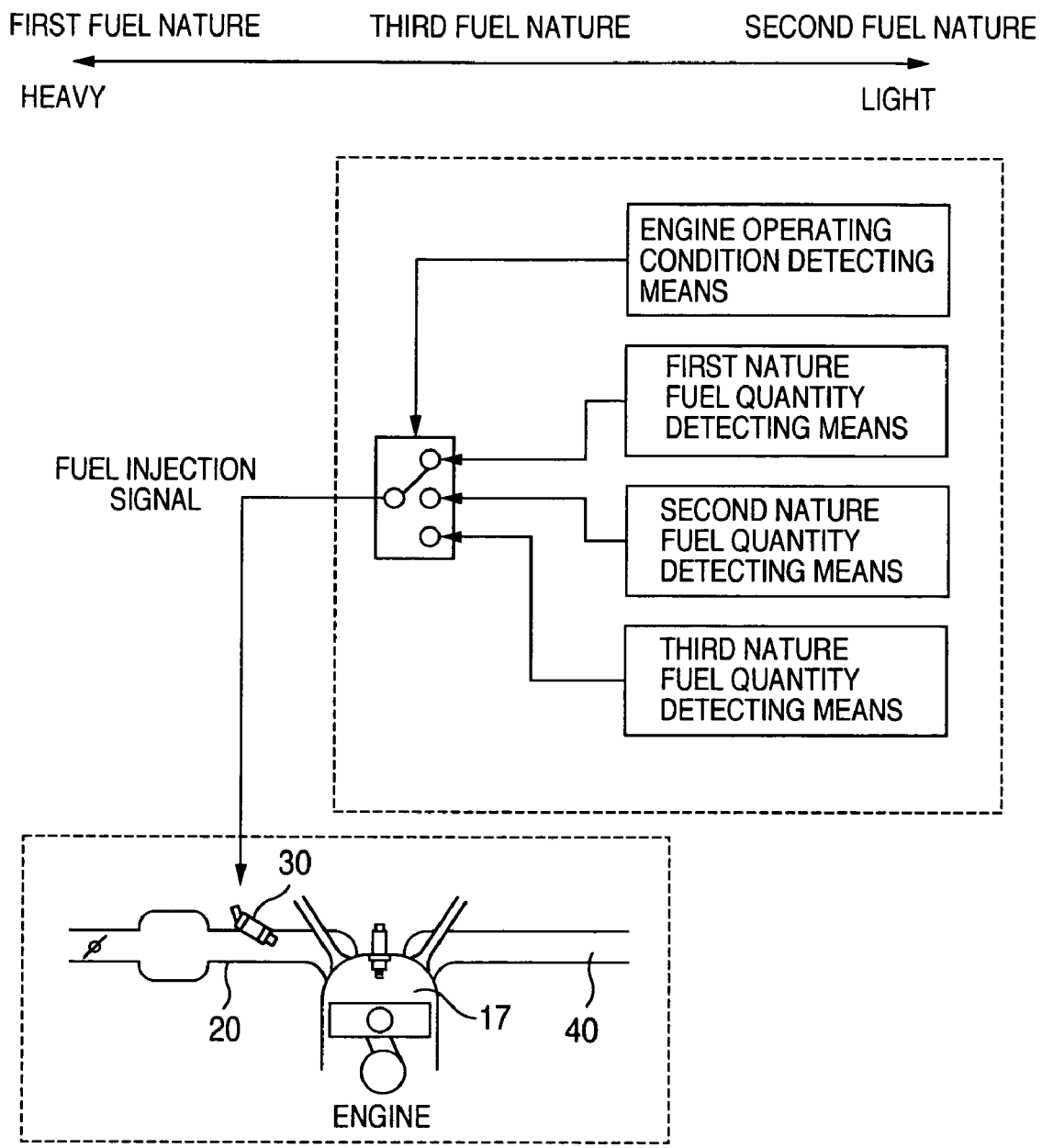
FIG. 6 is a view for explaining an eighth aspect of an engine control apparatus according to the present invention.
Figure 7:
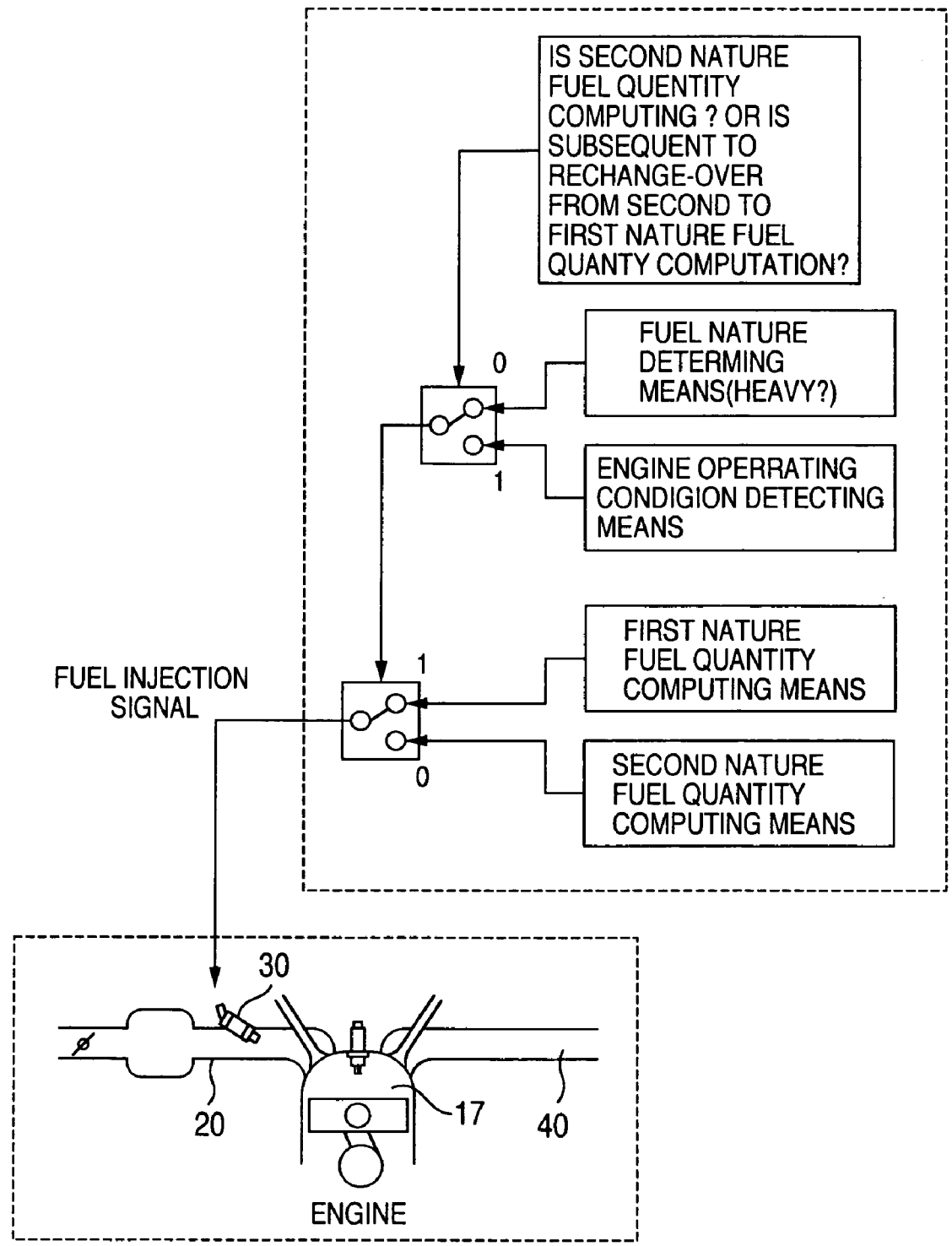
FIG. 7 is a view for explaining a ninth aspect of an engine control apparatus according to the present invention.
Figure 9:
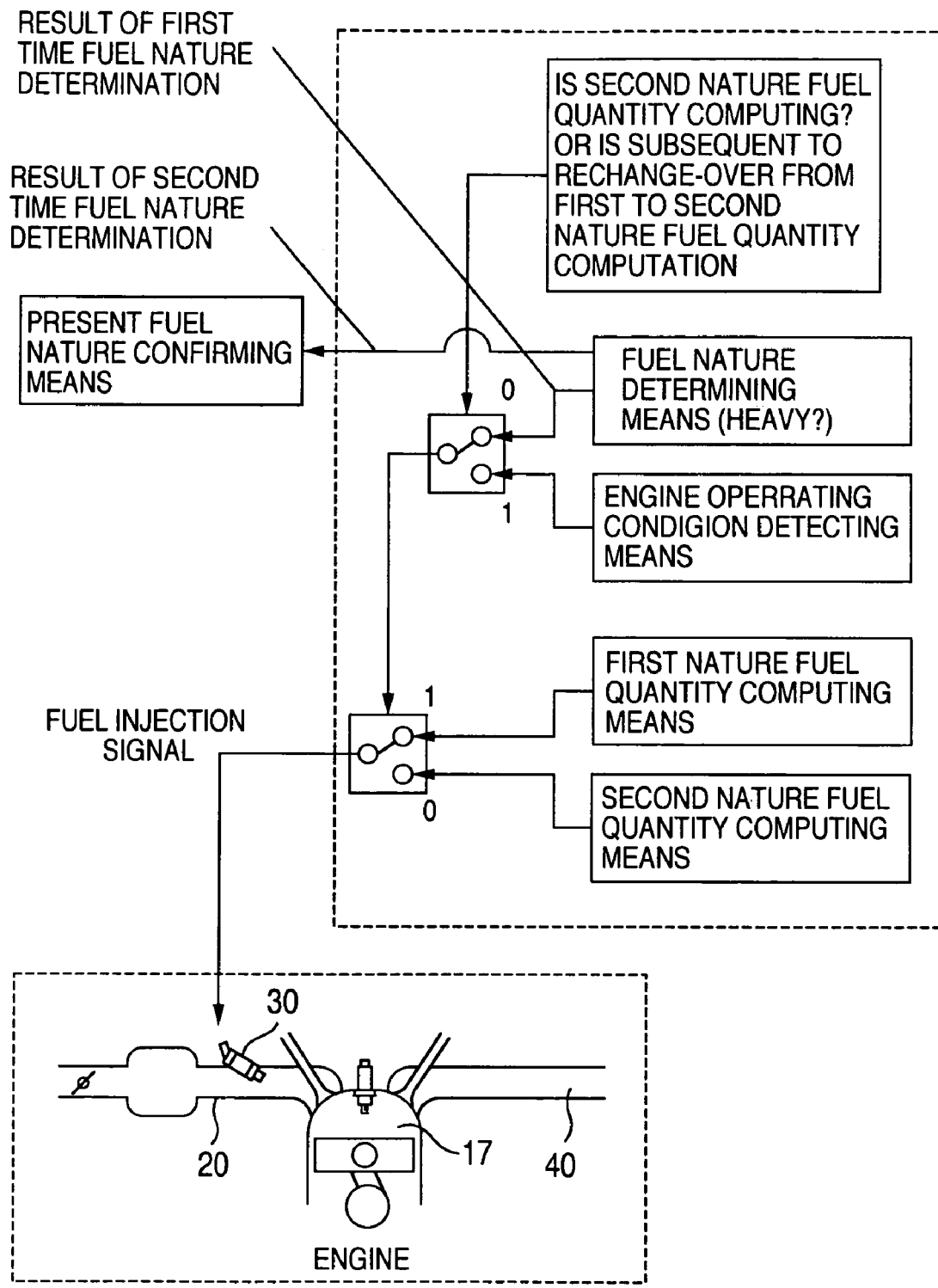
FIG. 9 is a view for explaining a fourteenth aspect of an engine control apparatus according to the present invention.
Figure 10:
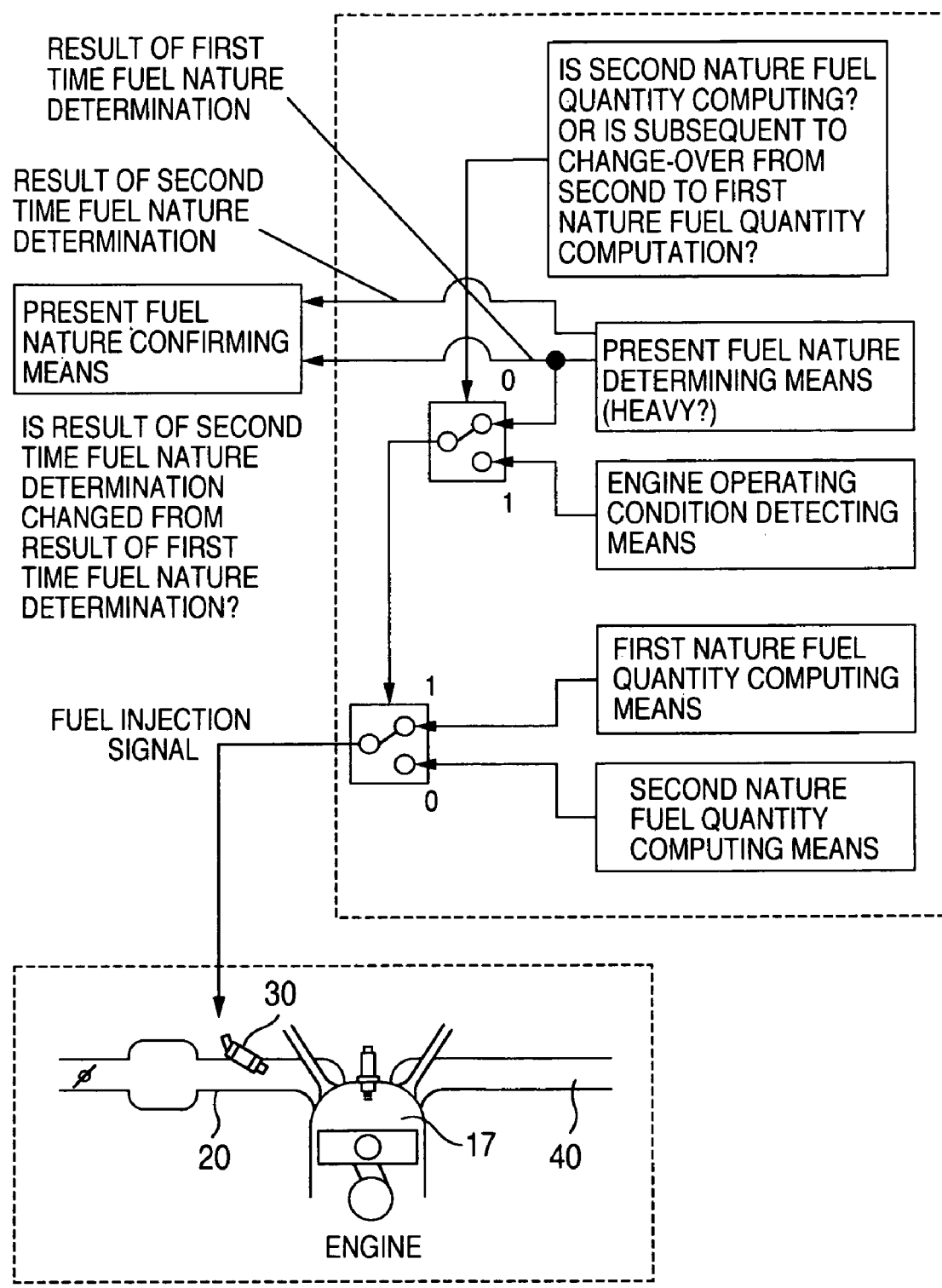
FIG. 10 is a view for explaining a fifteenth aspect of an engine control apparatus according to the present invention.
Figure 11:
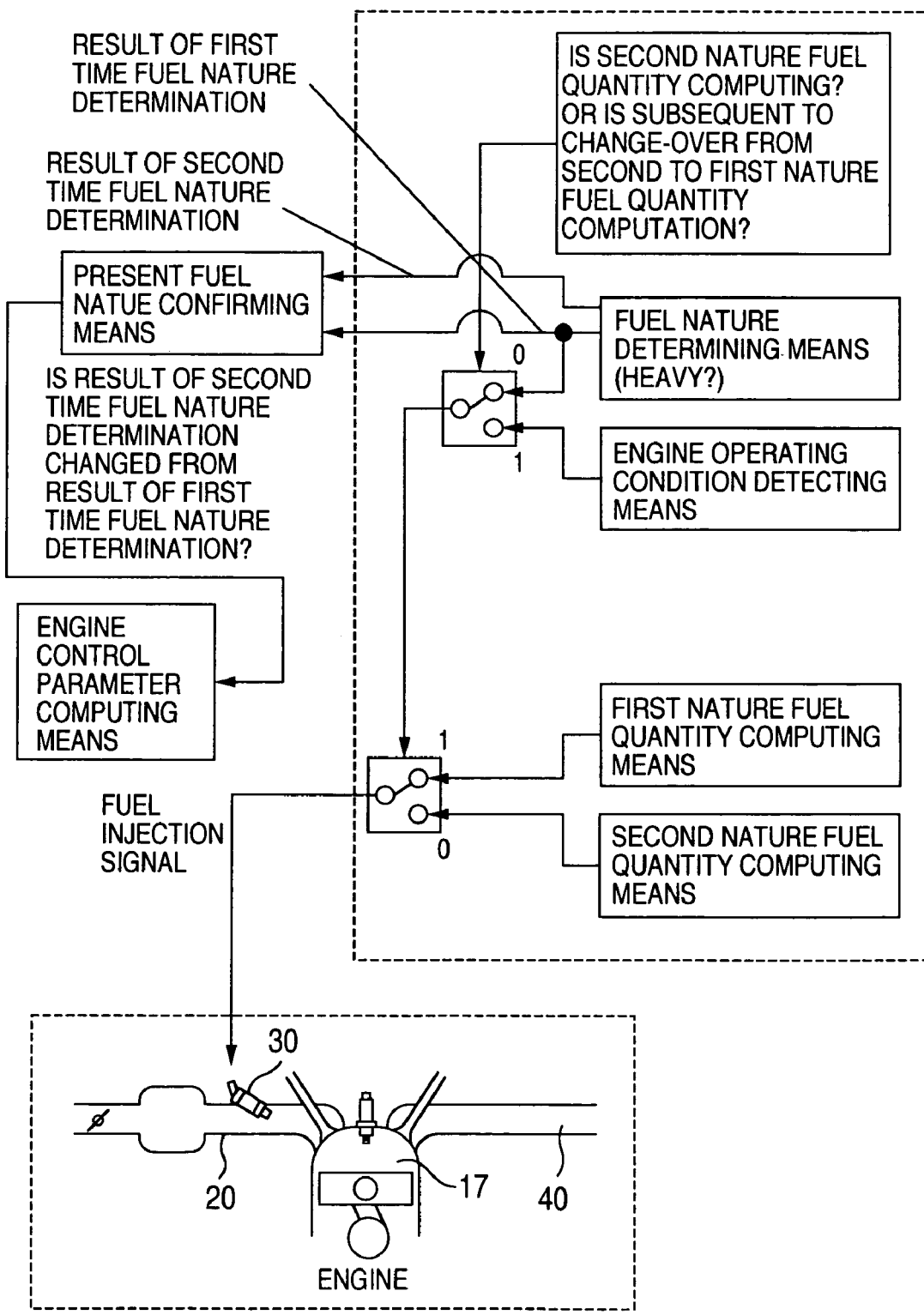
FIG. 11 is a view for explaining a sixteenth aspect of an engine control apparatus according to the present invention.
Figure 12:
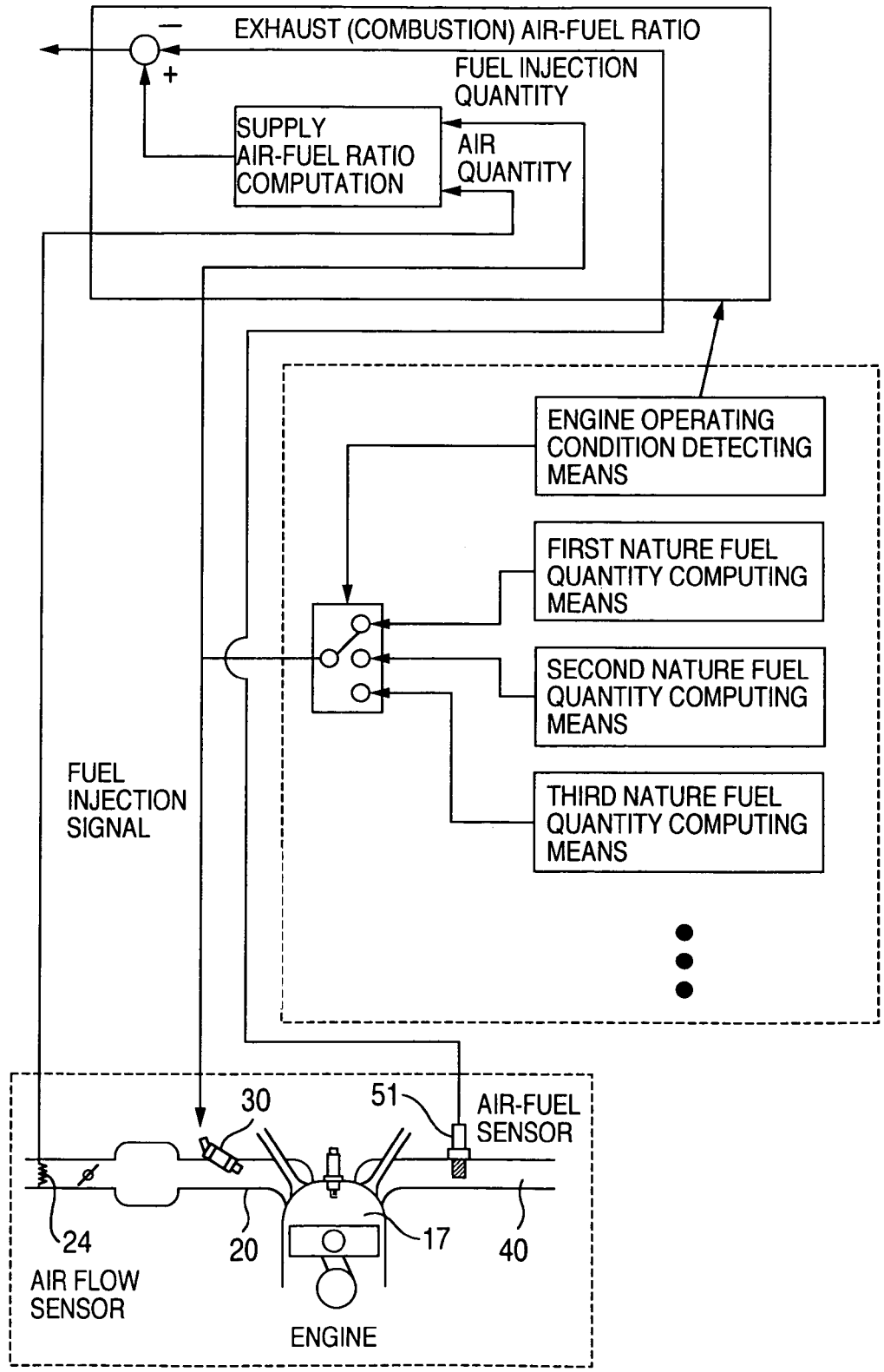
FIG. 12 is a view for explaining a twentieth aspect of an engine control apparatus according to the present invention.
Figure 13:
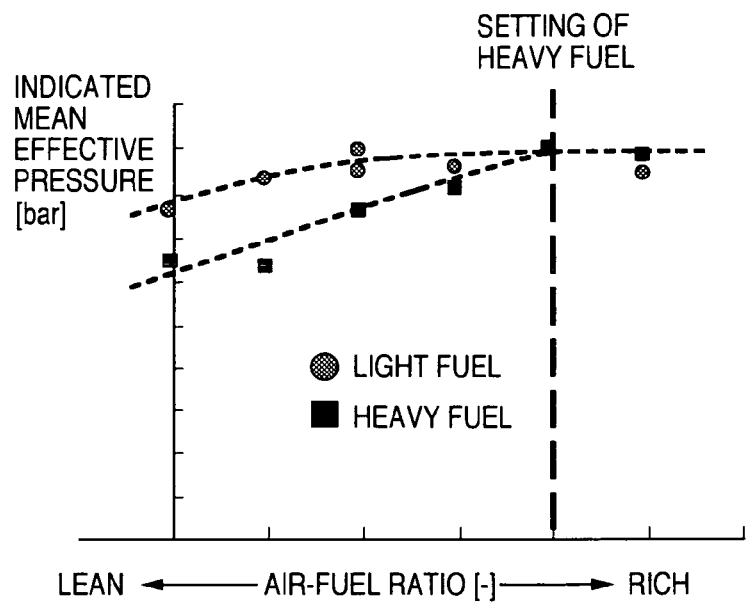
FIG. 13 is a graph exhibiting a relationship between the air-fuel ratio and an indicated mean effective pressure as to respective heavy fuel and light fuel.
Figure 14:
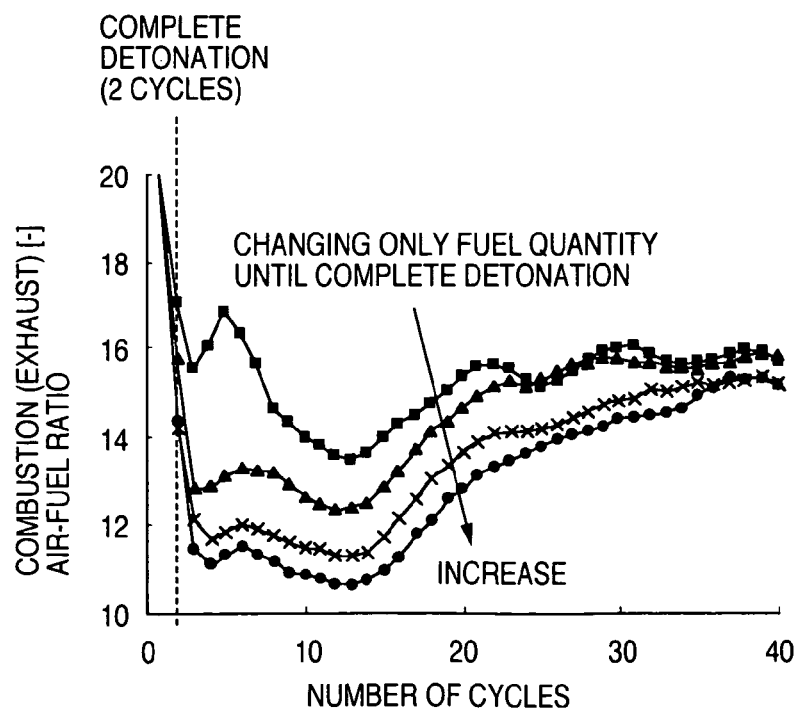
FIG. 14 is a view for exhibiting variation in air-fuel ratio in a period of 40 cycles of an engine after a start thereof in such a case that a fuel quantity is changed up to two cycles after the engine start.

Meanwhile, as stated above, since a substantial part of the fuel injected until a complete detonation is burnt after the complete detonation, such a fact that the fuel which is injected up to the complete detonation flows into the combustion chamber should be taken into consideration as to a set value which is change over after the setting of a heavy fuel. In view of this fact, the fuel nature is set so as to be lighter than the nature of a light fuel in this second embodiment. Further, a part of the fuel injected until the complete detonation, which forms a wall stream, is also substantially burnt within about 40 cycles, as shown in FIG. 14, and accordingly, thereafter, the change-over into the setting of a heavy fuel is made so as to optimize the combustion (exhaust) air-fuel ratio.

The configuration of the control system in the second embodiment is basically the same as that in the first embodiment shown in FIG. 17, that is, the basic fuel injection quantity computing means 120 is commonly used, except that the contents of processes carried by the fuel correction value computing means and the fuel correction value change-over determining means are different from those in the first embodiment.

Explanation will be hereinbelow made of the contents of processes carried out by the fuel correction value computing means 225 and the fuel correction value change-over determining means 230.

<Fuel Correction Value Computing Means 225 (FIG. 21)>

Figure 21:
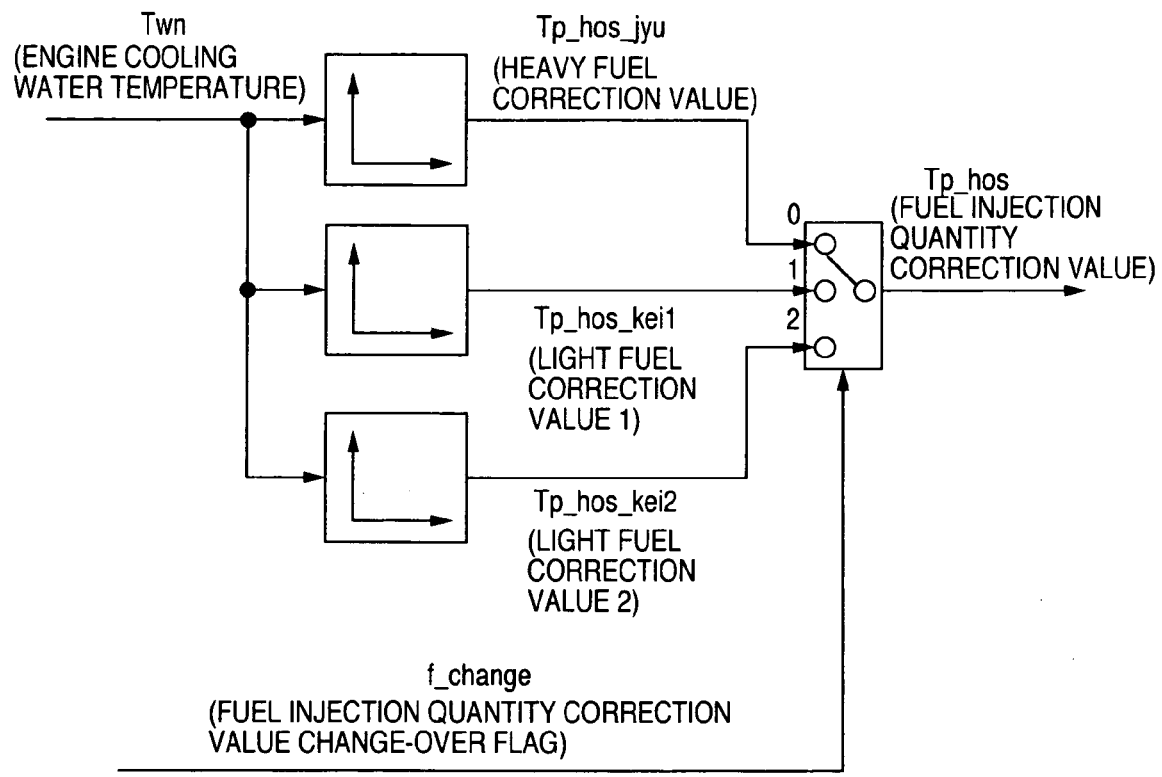
FIG. 21 is a view for explaining a fuel correction value computing means in a second embodiment of the present invention.

The fuel correction value computing means 225 computes a fuel correction value Tp_hos. Specifically, as shown in FIG. 21, in view of the fuel injection quantity correction value change-over flag f_change, if f_change=0, a heavy fuel correction value (Tp_hos_jyu) is used, but if f_change=1, a light fuel correction value 1Tp_hos_kei1 is set. Meanwhile, if f_change=2, a light fuel correction value 2Tp_hos_kei2 is used. The heavy fuel correction value Tp_hos_jyu, the light fuel correction value 1Tp_hos_kei1 and the light fuel correction value 2Tp_hos_kei2 are determined depending upon a cooling water temperature (Twn) as a parameter representative of the sensitivity of fuel evaporation rate. Further, an intake air temperature (Twa) may be used, instead of the cooling water temperature.

As stated above, since the substantial part of the fuel injected until the complete combustion is burnt after the complete detonation, such a fact that the fuel injected until the complete detonation flows into the combustion chamber should be taken into consideration for a set value (a light fuel correction value 1) which is changed over after the setting of a heavy fuel. In this case, the setting is preferably made to be lighter than that made by the fundamental light fuel setting. Further, the part of the fuel injected until the complete detonation, which forms a wall stream is substantially burnt within about 40 cycles as shown in FIG. 14, and accordingly, change-over into the setting of a light fuel (a light fuel correction value 2) is thereafter made so as to optimize the combustion (exhaust) air-fuel ratio.

<Fuel Correction Value Change-Over Determining Means 230 (FIG. 22)>

Figure 22:
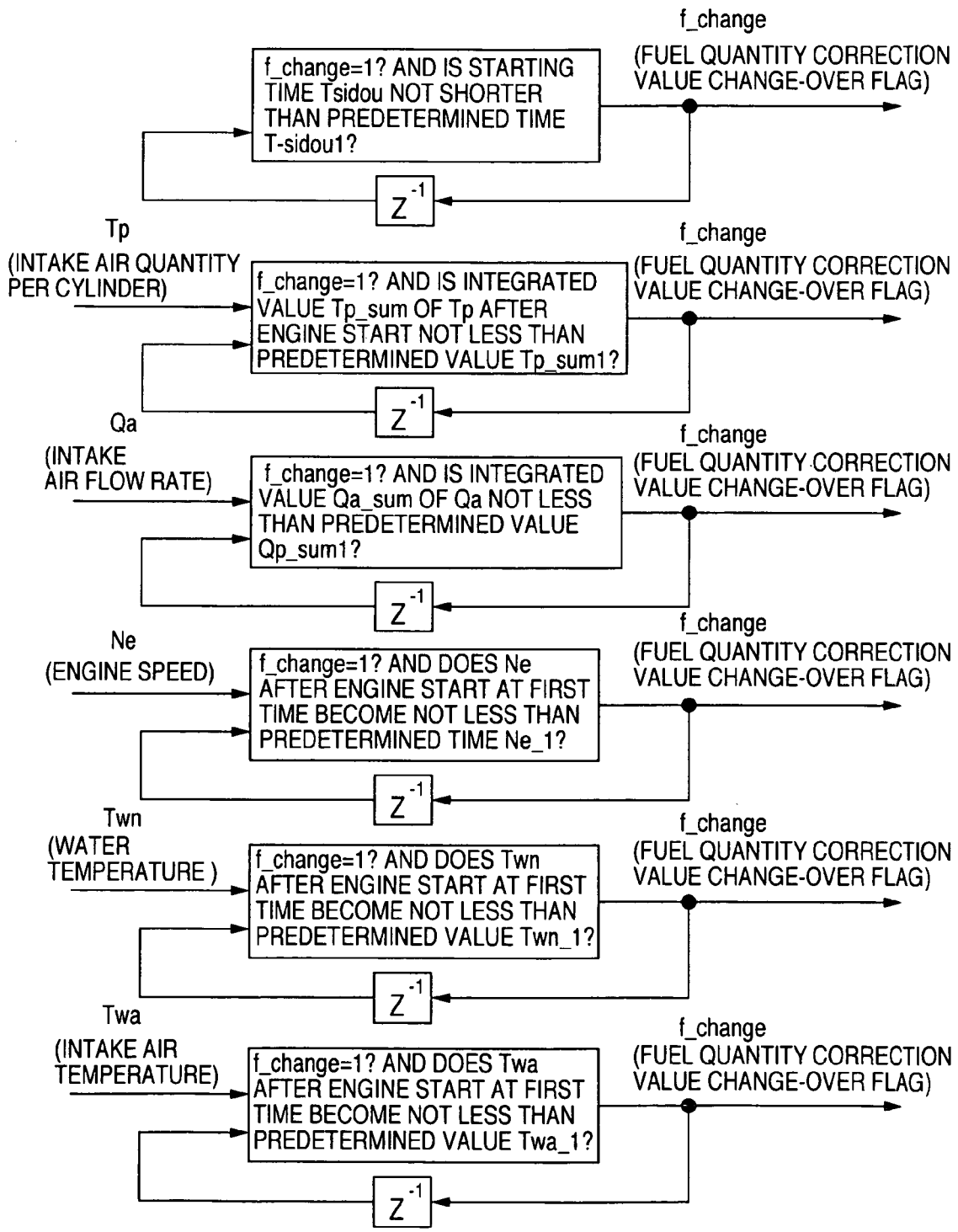
FIG. 22 is a view for explaining a fuel correction value change-over determining means in the second embodiment of the present invention.

The fuel correction value change-over determining means 230 computes the fuel injection quantity correction value change-over flag f_change, as stated above. Specifically, f_change is changed over 0 into 1 in the process shown in FIG. 20. Since this process is the same as that explained in the first embodiment, detailed explanation of this process will be omitted. A process for further change-over of f_change from 1 to 2 after change over of f_change into 1 is shown in FIG. 22.

As stated above, the timing with which the fuel injection quantity correction value change-over flag f_change is changed over from 1 to 2, is the one with which the setting 1 of a light fuel is forcibly changed over into the setting 2 of a light fuel. Of several terms for determining the timing, which may be considered, six terms will be exemplified as follows as shown in FIG. 22:

Is a time T-sidou after an engine start is not less than a predetermined value T_sidou1?

Is a Tp integrated value Tp_sum after an engine start is not less than a predetermined value Tp_sum1?

Is a Qa integrated value Qa_sum after an engine start is not less than a predetermined value Qa_sum1?

Does Ne become at a first time not less than a predetermined value Ne_1 after an engine start?

Does Twn becomes at a first time not less than a predetermined value Twn_1 after an engine start?

Does Twa becomes at a first time not less than a predetermined value Twa_1 after an engine start?

The above-mentioned predetermined values can be determined through experiments. The timing with which the setting 1 of a light fuel into the setting 2 of a light fuel is preferably before and after the time when the part of the fuel injected until the complete detonation, which forms a wall stream, is substantially burnt, or may be also empirically determined in view of the relationship between a supply air-fuel ratio and an exhaust air-fuel ratio.

Third Embodiment

In the first and second embodiments, the setting of a heavy fuel is always made during an engine start, irrespective of a nature of fuel used at present, and when predetermined terms have been satisfied after the engine start, the change-over is forcibly made into the setting of a light fuel (or change-over from the setting 1 of a light fuel into the setting 2 of a light fuel).

Meanwhile, as stated above, should the change-over be forcibly made into a fuel quantity for a light fuel in the case of the setting of a heavy fuel, the combustion fuel-air ratio would be lean so as to cause a risk of deterioration of the stability. In this case, a function for inhibiting deterioration of the stability of an engine is additionally incorporated. That is, in this third embodiment, there is provided a means for determining whether a fuel used at present is heavy or light after change-over into the setting of a light fuel. Accordingly, if this fuel nature determining means determines that a fuel used at present is heavy, change-over is made again into the setting of a heavy fuel.

Figure 23:
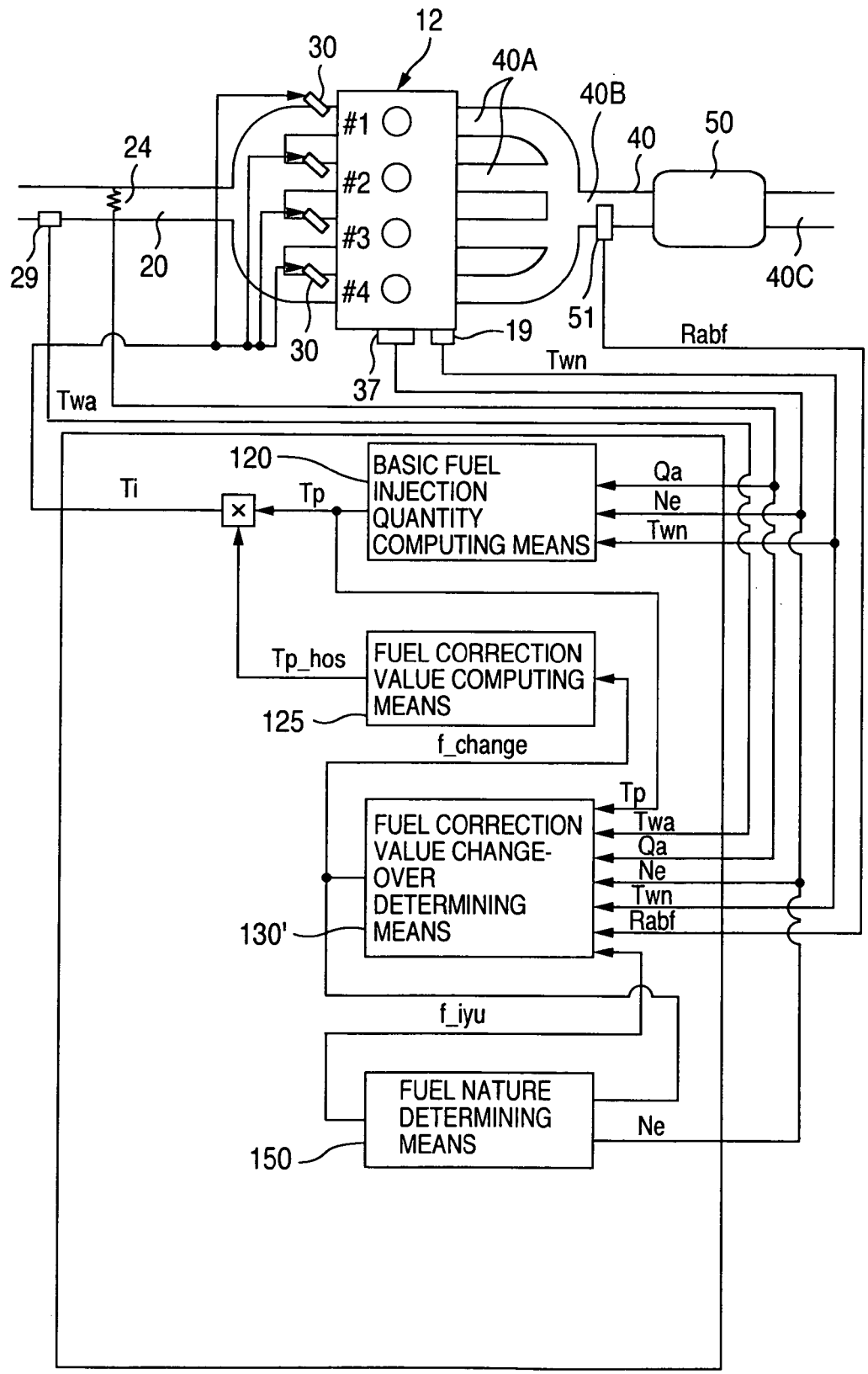
FIG. 23 is a view illustrating a control system in a third embodiment of the present invention.

Referring to FIG. 23 which shows a control system in the third embodiment, the fuel nature determining means 150 is added in the configurations of the first and the second embodiments. The fuel nature determining means 150 carries out signal processing of an engine speed, after a fuel quantity for a heavy fuel is forcibly changed over into a fuel quantity for a light fuel, so as to detect an instability of the engine in order to determine a nature of a fuel (determination of a heavy fuel). It if is determined that a heavy fuel is used, a heave fuel determination flag f_jyu is set to 1. f_jyu is transmitted to a fuel correction value change-over determining means 130', and if f_jyu=1, change-over is again made into the setting of a heavy fuel. The configuration of the third embodiment is similar to that of the first embodiment, except the above-mentioned matter, and accordingly, further explanation thereof will be omitted.

Explanation will be made of the respective processing means

<Fuel Correction Value Change-Over Determining Means 130' (FIG. 24)>

Figure 24:
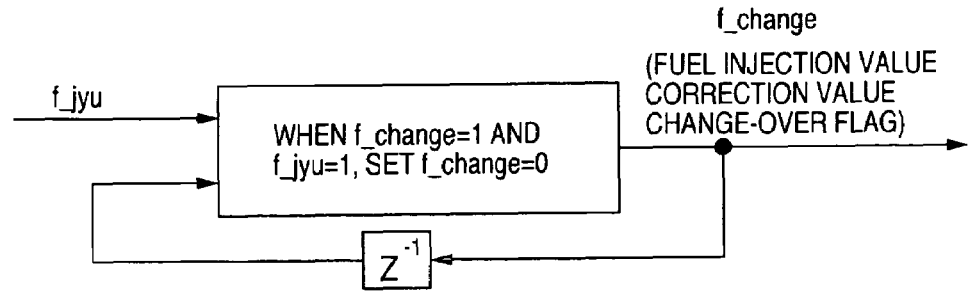
FIG. 24 is a view for explaining a fuel correction value change-over determining means in the third embodiment of the present invention.

Although detailed explanation of the fuel correction value change-over determining means 130' will be omitted since it has the same configuration as that of the means 130 shown in FIG. 20, a content of a process shown in FIG. 24 is added. If f_change=1 and f_jyu=1, f_change=0 is set. This is because if f_change=1, that is, after the change-over from the setting of a heavy fuel into the setting of a light fuel, when f_jyu=1, that is, if the fuel nature determining means 150 which will be explained later determines that a fuel used at present is heavy, f_change=0 is set, and the setting of a heavy fuel is again used.

<Fuel Nature Determining Means 150 (FIG. 25)>

Figure 25:
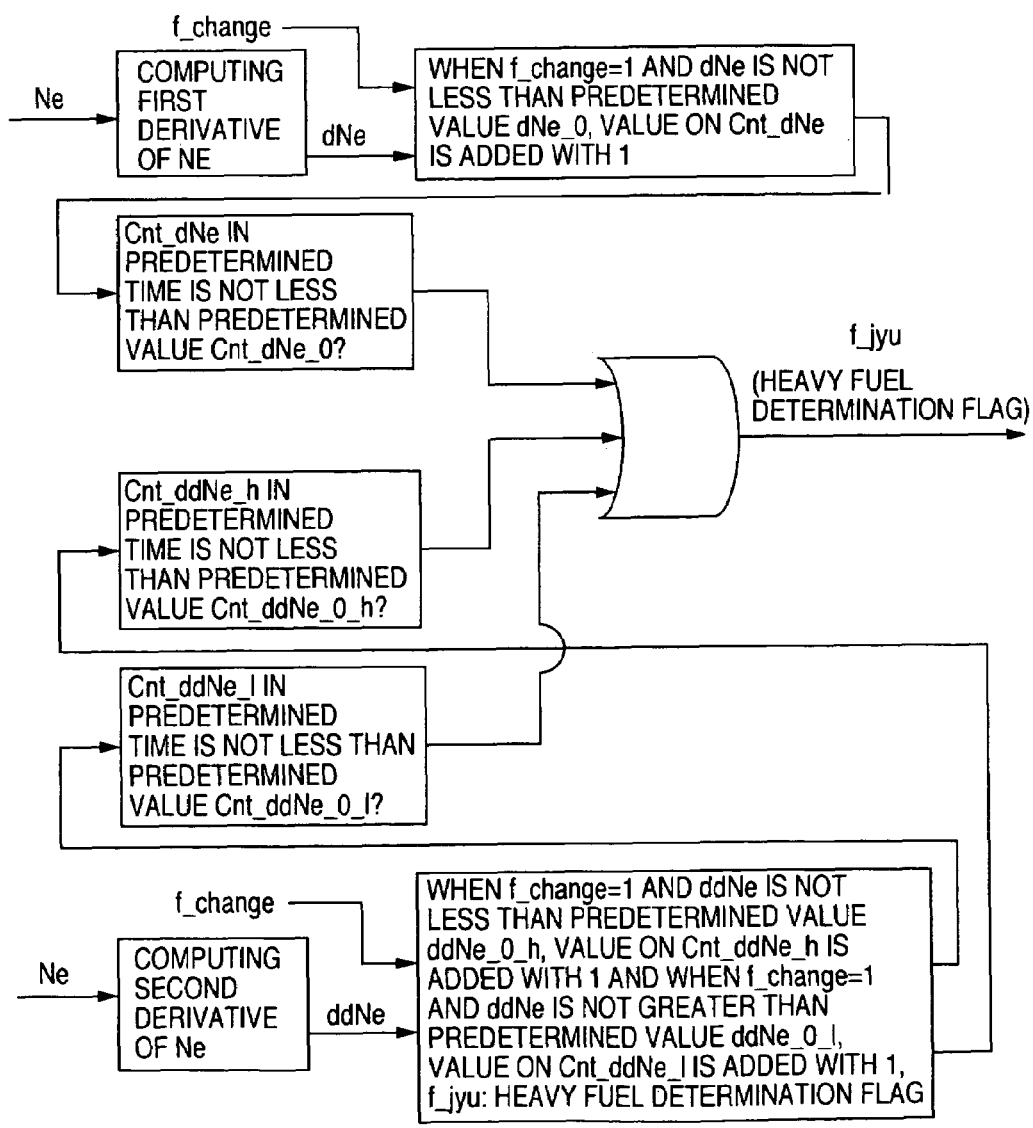
FIG. 25 is a view for explaining a fuel nature determining means in the third embodiment of the present invention.

The fuel nature determining means 150 computes the heavy fuel determining flag f_jyu. Specifically, the following process as shown in FIG. 25 is carried out:

A first derivative dNe and a second derivative ddNe of Ne are computed;

When f_change=1, that is, after change-over into the setting of a light fuel, if dNe is equal to a predetermine value dNe_0, the value on a counter Cnt_dNe is added thereto with 1; and If ddNe is not less than a predetermined value ddNe_0_h, the value on a counter Cnt_ddNe_h is added thereto with 1, but if ddNe is not greater than ddNe_0_l, the value on a counter Cnt_ddNe_1 is added with 1;

If the value on Cnt_dNe within a predetermined time is not less than a predetermined value Cnt_dNe_0, or if the value on Cnt_ddNe_h with a predetermined time is not less than a predetermined value Cnt_ddNe_0_h, or if the value on Cnt_ddNe_1 within a predetermined time is not less than a predetermined value Cnt_ddNe_0_1, it is determined that a fuel used at present is heavy, and f_jyu=1 is set.

The above-mentioned predetermined values can be experientially (empirically) determined, depending upon a desired performance.

Fourth Embodiment

In the third embodiment, there is provided the fuel nature determining means 150 for determining whether a fuel used at present is heavy or not after the change-over into the setting of a light fuel, and accordingly it is again changed over into the setting of a heavy fuel if the use of a heavy fuel is determined.

Meanwhile, in this embodiment, as stated above, should the forcible change-over into a fuel quantity for a light fuel be made after a complete detonation in such a case that a fuel used at present is heavy, the combustion air-fuel ratio would be lean so as to possibly deteriorate the stability. It is noted here that there may be considered another causes of deterioration of the stability, other than rarefaction of the air-fuel ratio due to the use of a heavy fuel. Accordingly, as stated in the third embodiment, after a fuel nature is determined to be heavy so as to make change-over into the setting of a heavy fuel, determination of a fuel nature (determination of a heavy fuel) is again made in a technique similar to that as stated above, and if variation in engine speed is settled after the change-over, it is confirmed that the use of a heavy fuel is true. On the contrary, if variation in engine speed is not settled even after the change-over into the setting of a heavy fuel, it is determined that the stability is deteriorated due to any cause other than the setting of a heavy fuel.

Figure 26:
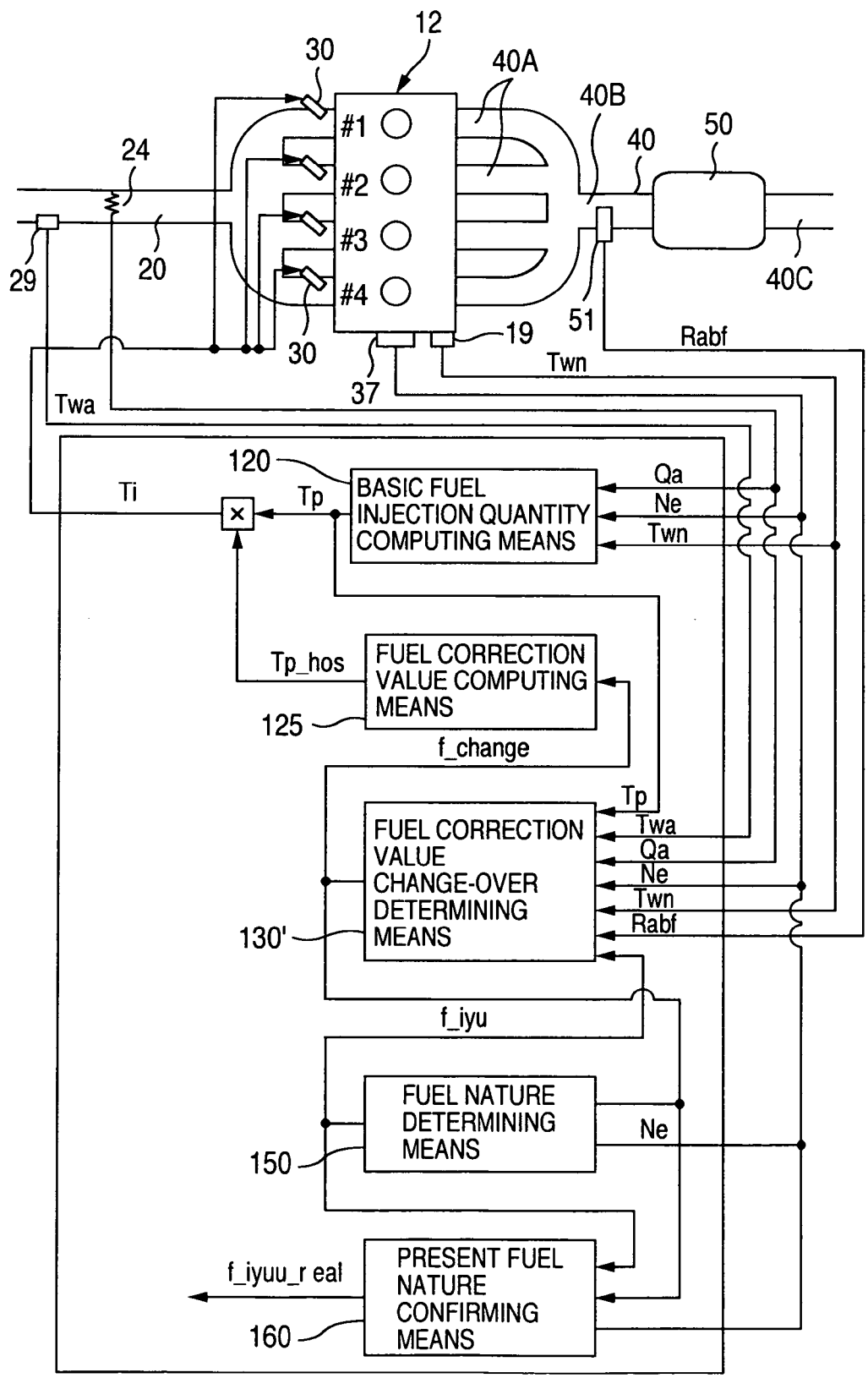
FIG. 26 is a view illustrating a control system in a fourth embodiment of the present invention.

Referring to FIG. 26 which shows a control system in the fourth embodiment of the present invention, a fuel nature confirming means 160 is added to the configuration of the third embodiment. The fuel nature confirming means 160 carries out again a signal process for an engine speed so as to detect an instability of an engine after the determination of a fuel nature (determination of a heavy fuel) is carried out so as to change over from a light fuel into a heavy fuel in the third embodiment, and if the instability is improved, it is confirmed at a first time that a fuel used at present is heavy. In the case of determination of a heavy fuel, a heavy fuel determination flag 2f_jyu_real becomes 1. In this embodiment, f_jyu_real is transmitted to another engine control parameter computing means which is not shown, and the change-over into an engine control parameter for a heavy fuel is made. As a typical parameter, there may be exemplified a parameter relating to an ignition timing or air-fuel ratio feed-back control.

The process in this embodiment is the same as that in the third embodiment except as stated above, and accordingly, further detailed explanation thereof will be omitted.

Detailed explanation will be made of the present fuel nature confirming means 160.

<Present Fuel Nature Confirming Means 160 (FIG. 27)>

Figure 27:
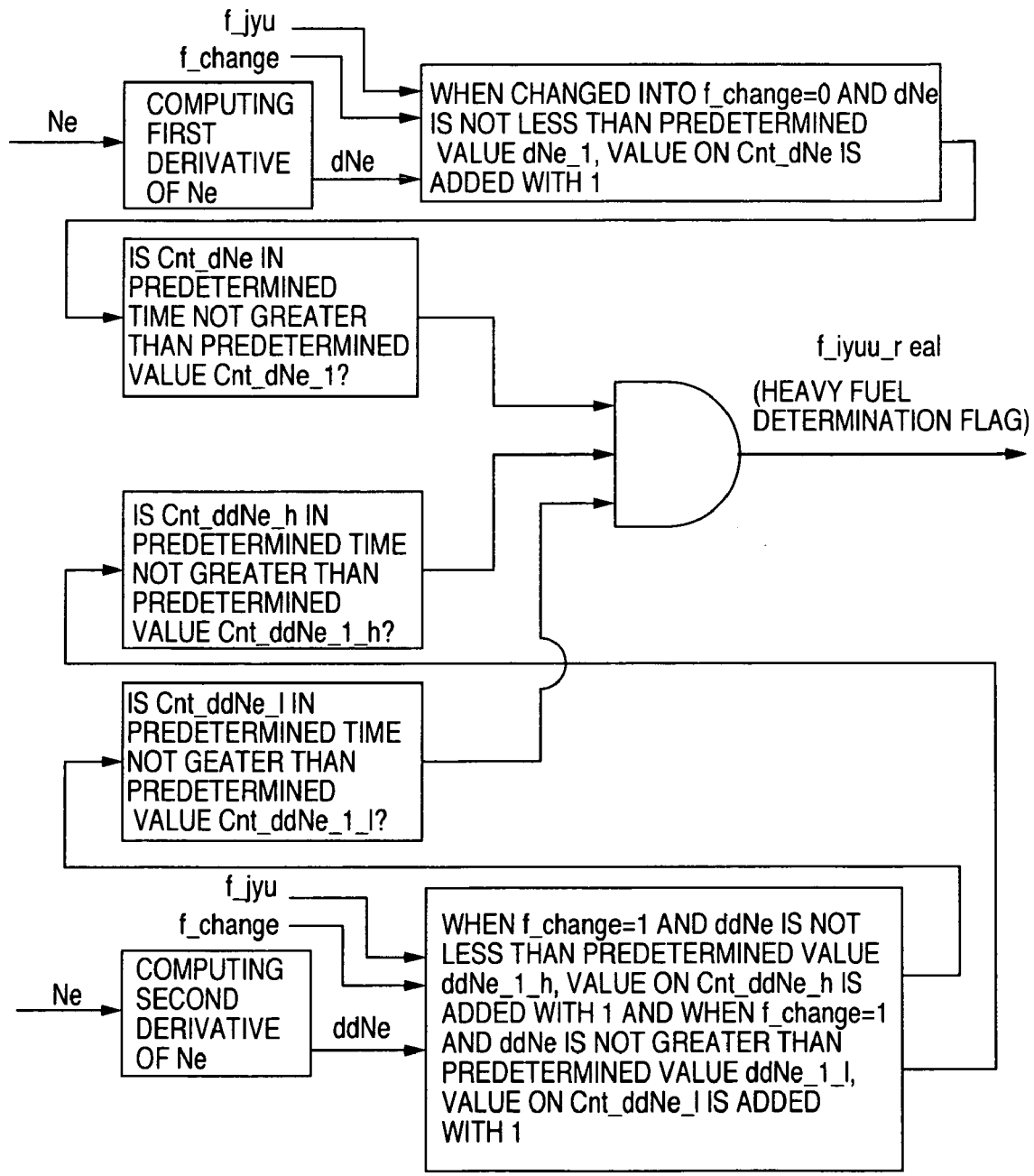
FIG. 27 is a view for explaining a fuel nature confirming means in the fourth embodiment of the present invention.

The present fuel nature confirming means computes a heavy fuel determination flag 2f_jyu_real. Specifically, the following process shown in FIG. 27 is carried out.

A first derivative dNe and a second derivative ddNe of Ne are computed, respectively.

Subsequent to change-over of f_change from 1 to 0 due to f_jyu=1, Cnt_dNe, Cnt_ddNe_h and Cnt_ddNe_l are reset to 0, and then, if dNe is equal to a predetermined value ddNe_1, the value on the counter Cnt_dNe is added thereto with 1.

If ddNe is not les than a predetermined value ddNe_1_h, the value on the counter Cnt_ddNe_h is added thereto with 1, but if ddNe is not greater than a predetermined value ddNe_1_l, the value on the counter Cnt_ddNe_l is added thereto with 1.

If the value on Cnt_dNe within a predetermined time is not greater than a predetermined value Cnt_dNe_1, and if the value on Cnt_ddNe_h within a predetermined time is not greater than a predetermined value Cnt_ddNe_1_h, and if the value on Cnt_ddNe_l within a predetermined is not greater than a predetermined value Cnt_ddNe_1_l, it is determined that a fuel used at present is heavy, and accordingly, f_jyu_real=1 is set. The above-mentioned predetermined time may be empirically (experimentally) determined in view of its desired performance.

Although no correction is made for respective cylinders in the third and fourth embodiments, if it is found that only a specific cylinder becomes lean in view of the above-mentioned variation in engine speed, correction is made for the respective cylinder such that a quantity of fuel fed into this specific cylinder may be increased.

Further, in addition to the above-mentioned embodiments, it has been known, as explained in the eighteenth aspect of the present invention, a specific correlation is present between a behavior of engine speed blow-up subsequent to an initial detonation and a fuel nature in a predetermined time up to the initial detonation during an engine start, thereby it is possible to determine a fuel nature on the basis of both result of determination of a fuel nature with the use of this correlation and result of determination by the above-mentioned fuel nature determining means 160 in order enhance the determination accuracy Further, as stated in the nineteenth aspect of the present invention, if, for example, the use of a heavy fuel is highly possible in view of a result of determination with the use of the correlation, a parameter used by the fuel nature determining means, for example, a determination threshold value, may be decreased in order to readily carry out a determination of the heavy fuel at an early time.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An engine control apparatus comprising a plurality of different nature fuel quantity computing means, and an operating condition detecting means for detecting an operating condition of an engine, characterized in that a first nature fuel quantity computing means among the plurality of different nature fuel quantity computing means is used as a fuel computing means during an engine start, and after the engine start, the first nature fuel quantity computing means is changed over into a second nature fuel computing means in accordance with an operating condition of the engine detected by the operating condition detecting means.

2. An engine control apparatus as set forth in claim 1, characterized in that the operating condition detecting means detects at least one of an engine speed, an elapsed time after an engine start, a number of cycles after the engine start, a pressure in an intake passage, a total intake air quantity after an engine start, an intake air temperature, an engine cooling water temperature and an air fuel ratio, and if the thus detected engine operating condition satisfies a predetermined term, the first nature fuel quantity computing means is changed into the second nature fuel quantity computing means.

3. An engine control apparatus as set forth in claim 1, characterized in that the second nature fuel quantity computing means computes a fuel quantity which is smaller than that computed by the first nature fuel quantity computing means.

4. An engine control apparatus as set forth in claim 1, characterized in that if the engine speed is lower than a predetermined value after the engine start or if the elapsed time after the engine start is shorter than a predetermined time, a fuel quantity is computed by the first nature fuel quantity computing means, and when the engine speed becomes higher than the predetermined value, or the elapsed time after the engine start becomes longer than the predetermined time, a fuel quantity is computed by the second nature fuel quantity computing means.

5. An engine control apparatus as set forth in claim 1, further comprising an air quantity detecting/estimating means for directly or indirectly measuring an air quantity sucked into a cylinder, and a basic fuel quantity computing means for computing a fuel quantity from an air quantity measured by the air quantity detecting/estimating means, characterized in that the first nature fuel quantity computing means comprises a first nature fuel increment means for carrying out increment correction for a fuel quantity computed by the basic fuel quantity computing means, and the second nature fuel quantity computing means comprises a second fuel nature increment computing means for carrying out increment correction for a fuel quantity by an amount which is smaller that of the increment correction by the first nature fuel increment means.

6. An engine control apparatus as set forth in claim 1, characterized in that the first nature fuel quantity computing means computes a fuel quantity of a heavy fuel, and the second nature fuel quantity computing means computes a fuel quantity of a light fuel.

7. An engine control apparatus as set forth in claim 1, characterized in that the first nature fuel quantity computing means computes a fuel quantity of a heavy fuel, and the second nature fuel quantity computing means computes a fuel quantity of a fuel which is intermediate between the heavy fuel and the light fuel.

8. An engine control apparatus as set forth in claim 1, characterized in that the first nature fuel quantity computing means computes a fuel quantity of a heavy fuel, a third nature fuel quantity computing means computes a fuel quantity of a light fuel, and the second nature fuel quantity computing means computes a fuel quantity of a fuel which is lighter than the light fuel, the first nature fuel quantity computing means is changed over into the second nature fuel quantity computing means in accordance with an operating condition of the engine detected by the operating condition detecting means after an engine start, and then, the second nature fuel quantity computing means is changed over into the third nature fuel quantity computing means.

9. An engine control apparatus as set forth in claim 1, further comprising a fuel nature determining means for determining a nature of a fuel, characterized in that after the first nature fuel quantity computing means is changed over into the second nature fuel quantity computing means, when the fuel nature determining means determines that a nature of a fuel is heavier than the second fuel nature, change over into the first nature fuel quantity computing means is carried out.

10. An engine control apparatus as set forth in claim 9, characterized in that the fuel nature determining means determines a fuel nature on the basis of at least one of an engine speed, a time required for rotating the engine by a predetermined rotating angle and an air-fuel ratio.

11. An engine control apparatus as set forth in claim 10, characterized in that the fuel nature determining means determines a fuel nature on the basis of a first derivative or a second derivative of the engine speed or the time required for rotating the engine by the predetermined rotating angle.

12. An engine control apparatus as set forth in claim 11, characterized in that the fuel nature determining means compares the first derivative with a predetermined value so as to determine a fuel nature, depending upon whether the former is greater or smaller than the latter.

13. An engine control apparatus as set forth in claim 11, characterized in that the fuel nature determining means compares the second derivative with a predetermined value so as to determine a fuel nature, depending upon whether the former is greater or smaller than the latter.

14. An engine control apparatus as set forth in claim 9, characterized in that the fuel nature determining means determines a nature of a fuel used at present in view of a behavior of engine speed until a predetermine time elapses from an initial time point of an engine start.

15. An engine control apparatus as set forth in claim 9, characterized in that a parameter such as a determination threshold value used in the fuel nature determining means is changed in view of a behavior of engine speed until a predetermined time elapses from an initial time point of an engine start.

16. An engine control apparatus as set forth in claim 1, further comprising a fuel nature confirming mean, characterized in that the fuel nature confirming means confirms a nature of fuel used at present so as to cause the fuel nature determining means again determines a fuel nature, after the second nature fuel quantity computing means is changed over into the first nature fuel quantity computing means as the fuel nature determining means determines that a fuel nature is heavier than the second fuel nature.

17. An engine control apparatus as set forth in claim 16, characterized in that the fuel nature confirming means confirms that the nature of a fuel used at present is heavy if a result of determination by the fuel nature determining means after the second nature fuel quantity computing means is changed over into the first nature fuel quantity computing means varies from a result of determination which has been previously made.

18. An engine control apparatus as set forth in claim 16, characterized by further comprising a means for computing a control parameter for an engine from a nature of a fuel used at present, which is determined by the fuel nature determining means.

19. An engine control apparatus as set forth in claim 18, characterized in that the engine control parameter computing means computes a control parameter for controlling respective cylinders, or a control parameter for uniformly controlling all cylinders.

20. An engine control apparatus as set forth in claim 1, characterized in that the operating condition detecting means detects, as the operating condition of the engine after an engine start, an intake air quantity, a fuel injection quantity and an exhaust air-fuel ratio.

21. An engine control apparatus as set forth in claim 1, characterized in that change-over of the fuel computing means is carried out without depending upon a nature of a fuel used at present.

22. An automobile incorporating an engine control apparatus as set forth in claim 1.

* * * * *